US008036760B2

(12) United States Patent
Mehta et al.

(10) Patent No.: US 8,036,760 B2
(45) Date of Patent: Oct. 11, 2011

(54) METHOD AND APPARATUS FOR INTELLIGENT CONTROL AND MONITORING IN A PROCESS CONTROL SYSTEM

(75) Inventors: Ashish Mehta, Goa (IN); Peter Wojsznis, Austin, TX (US); Marty J. Lewis, Cedar Park, TX (US); Larry O. Jundt, Round Rock, TX (US); Nathan W. Pettus, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 334 days.

(21) Appl. No.: 12/238,801

(22) Filed: Sep. 26, 2008

(65) Prior Publication Data
US 2009/0112335 A1 Apr. 30, 2009

Related U.S. Application Data

(63) Continuation-in-part of application No. 11/243,862, filed on Oct. 4, 2005, now Pat. No. 7,444,191.

(60) Provisional application No. 60/976,379, filed on Sep. 28, 2007.

(51) Int. Cl.
*G05B 13/02* (2006.01)
(52) U.S. Cl. ............................ 700/29; 700/28; 700/31
(58) Field of Classification Search .................. 700/121, 700/28–33, 37, 44–47; 703/2, 3
See application file for complete search history.

(56) References Cited

U.S. PATENT DOCUMENTS

| 3,671,725 A | * | 6/1972 | Bakke | 700/31 |
| 3,767,900 A | * | 10/1973 | Chao et al. | 700/31 |
| 4,029,122 A | | 6/1977 | Jaegtnes | |
| 4,054,780 A | * | 10/1977 | Bartley et al. | 700/30 |

(Continued)

FOREIGN PATENT DOCUMENTS

DE 42 32 826 10/1993

(Continued)

OTHER PUBLICATIONS

Chen, X., Pike, R.W., and Pururu, J.R., "Interactive On-line Optimization System", Mar. 1, 2001, Mineral Processing Research Institute—Louisiana State University.*

(Continued)

*Primary Examiner* — Kakali Chaki
*Assistant Examiner* — Kelvin Booker
(74) *Attorney, Agent, or Firm* — Marshall, Gerstein & Borun LLP

(57) ABSTRACT

A controller includes a control module to control operation of a process in response to control data, a plug-in module coupled to the control module as a non-layered, integrated extension thereof, and a model identification engine. The plug-in detects a change in the control data, and a collects the control data and data in connection with a condition of the process in response to the detected change. The model identification engine executes a plurality of model parameter identification cycles. Each cycle includes simulations of the process each having different simulation parameter values and each using the control data as an input, an estimation error calculation for each simulation based on an output of the simulation and based on the operating condition data, and a calculation of a model parameter value based on the estimation errors and simulation parameter values used in the simulation corresponding to each of the estimation errors.

30 Claims, 15 Drawing Sheets

U.S. PATENT DOCUMENTS

| | | | |
|---|---|---|---|
| 4,313,465 A | 2/1982 | Holzem et al. | |
| 4,376,450 A | 3/1983 | Fayfield et al. | |
| 4,523,286 A | 6/1985 | Koga et al. | |
| 4,542,649 A | 9/1985 | Charbonneau et al. | |
| 4,555,766 A | 11/1985 | Wright | |
| 4,590,963 A | 5/1986 | Gardner et al. | |
| 4,615,722 A | 10/1986 | Steffan et al. | |
| 4,617,960 A | 10/1986 | More | |
| 4,641,235 A | 2/1987 | Shigemasa et al. | |
| 4,660,416 A | 4/1987 | Charbonneau et al. | |
| 4,672,529 A | 6/1987 | Kupersmit | |
| 4,690,003 A | 9/1987 | McNennamy et al. | |
| 4,693,113 A | 9/1987 | McNennamy et al. | |
| 4,694,390 A | 9/1987 | Lee | |
| 4,694,391 A | 9/1987 | Guttag et al. | |
| 4,712,071 A | 12/1987 | Charbonneau et al. | |
| 4,742,713 A | 5/1988 | Abe et al. | |
| 4,831,873 A | 5/1989 | Charbonneau et al. | |
| 4,833,593 A | 5/1989 | Takeuchi et al. | |
| 4,858,103 A | 8/1989 | Takeuchi et al. | |
| 4,908,774 A | 3/1990 | Lund et al. | |
| 4,908,775 A | 3/1990 | Palusamy et al. | |
| 4,916,628 A | 4/1990 | Kugler | |
| 4,926,903 A | 5/1990 | Kawai | |
| 4,949,288 A | 8/1990 | Bookout | |
| 4,976,144 A | 12/1990 | Fitzgerald | |
| 4,977,778 A | 12/1990 | Nafziger et al. | |
| 4,980,825 A | 12/1990 | Tootell et al. | |
| 5,000,040 A | 3/1991 | Charbonneau et al. | |
| 5,018,215 A | 5/1991 | Nasr et al. | |
| 5,043,863 A | 8/1991 | Bristol et al. | |
| 5,086,273 A | 2/1992 | Leon | |
| 5,109,692 A | 5/1992 | Fitzgerald | |
| 5,140,263 A | 8/1992 | Leon | |
| 5,154,080 A | 10/1992 | Hill et al. | |
| 5,159,547 A | 10/1992 | Chand | |
| 5,159,835 A | 11/1992 | Nafziger et al. | |
| 5,180,896 A | 1/1993 | Gibby et al. | |
| 5,197,328 A | 3/1993 | Fitzgerald | |
| 5,198,973 A | 3/1993 | Steutermann | |
| 5,228,342 A | 7/1993 | McShane | |
| 5,233,542 A | 8/1993 | Hohner et al. | |
| 5,245,528 A * | 9/1993 | Saito et al. | 700/41 |
| 5,251,148 A | 10/1993 | Haines et al. | |
| 5,253,185 A | 10/1993 | Mutchler et al. | |
| 5,272,621 A | 12/1993 | Aoki et al. | |
| 5,272,647 A | 12/1993 | Hayes | |
| 5,319,539 A * | 6/1994 | Shinskey | 700/37 |
| 5,320,123 A | 6/1994 | Corso et al. | |
| 5,329,465 A | 7/1994 | Arcella et al. | |
| 5,329,956 A | 7/1994 | Marriott et al. | |
| 5,335,164 A | 8/1994 | Gough, Jr. et al. | |
| 5,337,262 A | 8/1994 | Luthi et al. | |
| 5,347,446 A * | 9/1994 | Iino et al. | 700/29 |
| 5,394,322 A * | 2/1995 | Hansen | 700/37 |
| 5,396,167 A | 3/1995 | Leon | |
| 5,396,416 A * | 3/1995 | Berkowitz et al. | 700/45 |
| 5,402,333 A * | 3/1995 | Cardner | 700/31 |
| 5,408,406 A * | 4/1995 | Mathur et al. | 700/45 |
| 5,410,470 A * | 4/1995 | Yamaoka et al. | 700/45 |
| 5,414,648 A | 5/1995 | Morgan et al. | |
| 5,420,785 A * | 5/1995 | Shinskey | 700/37 |
| 5,425,270 A | 6/1995 | McDonald et al. | |
| 5,433,245 A | 7/1995 | Prather et al. | |
| 5,451,923 A | 9/1995 | Seberger et al. | |
| 5,453,925 A | 9/1995 | Wojsznis et al. | |
| 5,461,559 A | 10/1995 | Heyob et al. | |
| 5,475,299 A | 12/1995 | Leon | |
| 5,477,149 A | 12/1995 | Spencer et al. | |
| 5,487,302 A | 1/1996 | Casada et al. | |
| 5,488,561 A * | 1/1996 | Berkowitz et al. | 700/45 |
| 5,519,605 A * | 5/1996 | Cawlfield | 700/31 |
| 5,555,171 A | 9/1996 | Sonehara et al. | |
| 5,557,546 A | 9/1996 | Fukai et al. | |
| 5,564,470 A | 10/1996 | Denmark et al. | |
| 5,568,378 A | 10/1996 | Wojsznis | |
| 5,586,305 A | 12/1996 | Eidson et al. | |
| 5,587,899 A | 12/1996 | Ho et al. | |
| 5,625,552 A | 4/1997 | Mathur et al. | |
| 5,687,098 A | 11/1997 | Grumstrup et al. | |
| 5,740,033 A * | 4/1998 | Wassick et al. | 700/29 |
| 5,748,467 A | 5/1998 | Qin et al. | |
| 5,838,561 A * | 11/1998 | Owen | 700/32 |
| 5,909,370 A * | 6/1999 | Lynch | 700/50 |
| 5,933,345 A * | 8/1999 | Martin et al. | 700/44 |
| 5,950,006 A | 9/1999 | Crater et al. | |
| 5,966,679 A | 10/1999 | Snowbarger et al. | |
| 5,995,753 A | 11/1999 | Walker | |
| 6,003,037 A | 12/1999 | Kassabgi et al. | |
| 6,026,352 A | 2/2000 | Burns et al. | |
| 6,041,320 A | 3/2000 | Qin et al. | |
| 6,047,221 A * | 4/2000 | Piche et al. | 700/44 |
| 6,047,222 A | 4/2000 | Burns et al. | |
| 6,049,738 A | 4/2000 | Kayama et al. | |
| 6,056,781 A * | 5/2000 | Wassick et al. | 703/12 |
| 6,088,630 A * | 7/2000 | Cawlfield | 700/266 |
| 6,112,517 A * | 9/2000 | Yasui et al. | 60/274 |
| 6,128,541 A | 10/2000 | Junk | |
| 6,144,897 A * | 11/2000 | Selliers | 700/269 |
| 6,192,321 B1 | 2/2001 | Grumstrup et al. | |
| 6,195,591 B1 | 2/2001 | Nixon et al. | |
| 6,195,988 B1 * | 3/2001 | Yasui et al. | 60/285 |
| 6,201,996 B1 | 3/2001 | Crater et al. | |
| 6,249,712 B1 | 6/2001 | Boiquaye | |
| 6,278,899 B1 * | 8/2001 | Piche et al. | 700/44 |
| 6,330,484 B1 | 12/2001 | Qin | |
| 6,353,766 B1 | 3/2002 | Weinzierl et al. | |
| 6,445,962 B1 | 9/2002 | Blevins et al. | |
| 6,473,670 B1 * | 10/2002 | Huhtelin | 700/128 |
| 6,487,459 B1 * | 11/2002 | Martin et al. | 700/44 |
| 6,577,908 B1 * | 6/2003 | Wojsznis et al. | 700/42 |
| 6,601,005 B1 * | 7/2003 | Eryurek et al. | 702/104 |
| 6,647,315 B1 | 11/2003 | Sherriff et al. | |
| 6,654,649 B2 * | 11/2003 | Treiber et al. | 700/31 |
| 6,684,150 B2 * | 1/2004 | Yasui et al. | 700/29 |
| 6,697,767 B2 * | 2/2004 | Wang et al. | 702/189 |
| 6,711,531 B1 * | 3/2004 | Tanaka et al. | 700/31 |
| 6,712,669 B1 * | 3/2004 | Chang | 451/5 |
| 6,735,483 B2 * | 5/2004 | Martin et al. | 700/29 |
| 6,738,677 B2 * | 5/2004 | Martin et al. | 700/44 |
| 6,745,088 B2 | 6/2004 | Gagne | |
| 6,757,579 B1 * | 6/2004 | Pasadyn | 700/108 |
| 6,772,036 B2 * | 8/2004 | Eryurek et al. | 700/127 |
| 6,795,798 B2 | 9/2004 | Eryurek et al. | |
| 6,819,999 B2 | 11/2004 | Hartzheim | |
| 6,834,226 B2 | 12/2004 | Hartzheim | |
| 6,839,599 B2 * | 1/2005 | Martin et al. | 700/79 |
| 6,885,907 B1 * | 4/2005 | Zhang et al. | 700/31 |
| 6,901,300 B2 * | 5/2005 | Blevins et al. | 700/46 |
| 6,938,843 B2 * | 9/2005 | Johansson | 241/21 |
| 6,950,711 B2 * | 9/2005 | Havener et al. | 700/28 |
| 6,950,741 B2 * | 9/2005 | Ishikawa et al. | 700/55 |
| 7,047,089 B2 * | 5/2006 | Martin et al. | 700/29 |
| 7,050,863 B2 * | 5/2006 | Mehta et al. | 700/29 |
| 7,050,866 B2 * | 5/2006 | Martin et al. | 700/44 |
| 7,054,706 B2 * | 5/2006 | Kempf et al. | 700/121 |
| 7,058,617 B1 * | 6/2006 | Hartman et al. | 706/16 |
| 7,110,834 B2 * | 9/2006 | Martin et al. | 700/29 |
| 7,113,834 B2 * | 9/2006 | Wojsznis et al. | 700/33 |
| 7,149,590 B2 * | 12/2006 | Martin et al. | 700/44 |
| 7,181,295 B2 * | 2/2007 | Yu et al. | 700/42 |
| 7,187,989 B2 * | 3/2007 | Attarwala | 700/29 |
| 7,188,637 B2 * | 3/2007 | Dreyer et al. | 137/6 |
| 7,194,318 B2 * | 3/2007 | Attarwala | 700/29 |
| 7,203,555 B2 * | 4/2007 | Ogunnaike et al. | 700/28 |
| 7,213,006 B2 * | 5/2007 | Hartman et al. | 706/16 |
| 7,337,022 B2 * | 2/2008 | Wojsznis et al. | 700/36 |
| 7,340,336 B2 * | 3/2008 | Yasui et al. | 701/67 |
| 7,359,830 B2 * | 4/2008 | Hupkes et al. | 700/109 |
| 7,376,472 B2 * | 5/2008 | Wojsznis et al. | 700/29 |
| 7,391,712 B2 * | 6/2008 | Geile et al. | 370/204 |
| 7,418,301 B2 * | 8/2008 | Boe et al. | 700/37 |
| 7,444,191 B2 * | 10/2008 | Caldwell et al. | 700/29 |
| 7,451,004 B2 * | 11/2008 | Thiele et al. | 700/28 |
| 7,486,998 B2 * | 2/2009 | Ogunnaike et al. | 700/28 |
| 7,489,623 B2 * | 2/2009 | Geile | 370/208 |
| 7,515,977 B2 * | 4/2009 | Eryurek et al. | 700/83 |

| | | | |
|---|---|---|---|
| 7,551,969 B2* | 6/2009 | Wojsznis et al. | 700/31 |
| 7,590,511 B2 | 9/2009 | Huisenga et al. | |
| 7,610,108 B2* | 10/2009 | Boe et al. | 700/44 |
| 7,650,195 B2* | 1/2010 | Fan et al. | 700/31 |
| 7,783,370 B2* | 8/2010 | Nixon et al. | 700/83 |
| 7,826,909 B2* | 11/2010 | Attarwala | 700/45 |
| 7,930,044 B2* | 4/2011 | Attarwala | 700/44 |
| 2002/0123864 A1 | 9/2002 | Eryurek et al. | |
| 2003/0014131 A1* | 1/2003 | Havener et al. | 700/29 |
| 2003/0195641 A1 | 10/2003 | Wojsznis et al. | |
| 2005/0088320 A1 | 4/2005 | Kovach | |
| 2005/0096872 A1* | 5/2005 | Blevins et al. | 702/183 |
| 2005/0149209 A1 | 7/2005 | Wojsznis et al. | |
| 2006/0111858 A1* | 5/2006 | Zhu | 702/85 |
| 2007/0078533 A1 | 4/2007 | Caldwell et al. | |
| 2007/0129917 A1* | 6/2007 | Blevins et al. | 703/6 |
| 2007/0142936 A1 | 6/2007 | Denison et al. | |
| 2007/0156264 A1* | 7/2007 | Schleiss et al. | 700/83 |
| 2007/0168060 A1* | 7/2007 | Nixon et al. | 700/83 |
| 2007/0208549 A1* | 9/2007 | Blevins et al. | 703/6 |
| 2008/0066004 A1* | 3/2008 | Blevins et al. | 715/771 |
| 2008/0300709 A1* | 12/2008 | Collette et al. | 700/103 |
| 2009/0105855 A1* | 4/2009 | Mehta et al. | 700/89 |
| 2009/0112335 A1* | 4/2009 | Mehta et al. | 700/29 |
| 2009/0125128 A1* | 5/2009 | Eldridge et al. | 700/86 |
| 2009/0198350 A1* | 8/2009 | Thiele | 700/30 |
| 2009/0287319 A1* | 11/2009 | Attarwala | 700/29 |
| 2009/0319060 A1* | 12/2009 | Wojsznis et al. | 700/30 |
| 2010/0241247 A1* | 9/2010 | Attarwala | 700/21 |

FOREIGN PATENT DOCUMENTS

| | | |
|---|---|---|
| DE | 42 18 320 | 12/1993 |
| EP | 0 275 629 | 7/1988 |
| EP | 0 315 391 | 5/1989 |
| EP | 0 462 432 | 12/1991 |
| EP | 0 482 900 | 4/1992 |
| EP | 0 572 245 | 12/1993 |
| EP | 0 637 713 | 2/1995 |
| EP | 0 660 017 | 6/1995 |
| EP | 0 708 389 | 4/1996 |
| EP | 1 284 446 | 2/2003 |
| GB | 2 194 648 | 3/1988 |
| GB | 2 196 445 | 4/1988 |
| GB | 2 348 020 | 9/2000 |
| GB | 2 371 884 | 8/2002 |
| GB | 2 400 924 | 10/2004 |
| GB | 2 409 293 A | 6/2005 |
| JP | 62-89908 | 4/1987 |
| JP | 62-229 044 | 10/1987 |
| JP | 2003-293344 | 10/2003 |
| WO | WO-97/12300 A2 | 4/1997 |
| WO | WO-97/16776 | 5/1997 |
| WO | WO-00/14611 | 3/2000 |
| WO | WO-00/33209 | 6/2000 |
| WO | WO-01/98845 | 12/2001 |
| WO | WO-02/057856 | 7/2002 |
| WO | WO 2004070569 A2 * | 8/2004 |
| WO | WO-2005/062906 A2 | 7/2005 |
| WO | WO 2008030374 A2 * | 3/2008 |
| WO | WO-2008/119008 | 10/2008 |
| WO | WO 2009120362 A2 * | 10/2009 |

OTHER PUBLICATIONS

Harris, T.J., "Assessment of Control Loop Performance", Oct. 1989, The Canadian Journal of Chemical Engineering, vol. 67.*
Henson, M.A., "Nonlinear Model Predictive Control: Current Status and Future Directions", Jul. 1998, Computers and Chemical Engineering, vol. 23, pp. 187-202.*
Ramakrishnan, S., Wysk, R.A., and Prabhu, V.V., "Prediction of Process Parameters for Intelligent Control of Tunnel Freezers Using Simulation", Jul. 2001, Journal of Food Engineering, vol. 65, pp. 23-31.*
Robinson, P., "Autonomous Design and Execution of Process Controllers for Untended Scientific Instruments", 1997, ACM.*
Astrom et al., "Industrial Adaptive Controllers Based on Frequency Response Techniques", *Automatica*, 27(4):599-609 (1991).
Beatty, "Intelligent Valve Based Process Sensing and Control," *ISA, 46 Advances in Instrumentation and Control* No. 2, pp. 1175-1185 (1991).
Charbonneau, "Early Diagnosis of Motor Operated Valve Mechanical and Electrical Degradations," *The American Society of Mechanical Engineers*, 84-NE-16 (1984).
De Persis, et al., "Further results on switched control of linear systems with constraints," *Proceedings of the 41st IEEE Conference on Decision and Control*, Las Vegas, NV, USA, pp. 2810-2815 (2002).
Dimmick et al., "Ultrasonic Leak Detection Cuts Valve Maintenance Costs," *Power Engineering*, pp. 35-38 (1986).
Electronic Power Research Instistute, "Improvements in Motor-Operated Valves," EPRI NP-4254 (1985).
Electronic Power Research Instistute, "Key Valves Prioritization Study," EPRI NP-3611 (1984).
Examination Report under Section 18(3) issued by the United Kingdom Patent Office on Feb. 14, 2006 for GB Application No. 0408598.1.
FIELDVUE™, "Digital Valve Controller DVC5000 Series Remotely Accessible Information," Bulletin 62.1:DVC5000(S1), (1994).
FIELDVUE™, "Digital Valve Controller Type DVC5000 Series," Instruction Manual, (1995).
FIELDVUE™, "Digital Vave Controller Type DVC5000 Series," Bulletin 62.1:DVC5000, (1994).
Hanagud et al., "Artificial Intelligence -Based Model-Adaptive Approach to Flexible Structure Control," *American Institute of Aeronautics and Astronautics, Inc.*, 13(3):534-544 (1987).
Hespanha et al., "Overcoming the limitations of adaptive control by means of logic-based switching," *Systems and Control Letters*, 49:49-65 (2003).
Hespanha et al., "Stabilization of Nonholonomic Integrators via Logic-Based Switching," *Automatica*, pp. 385-394 (1999).
Hägglund, et al., "Industrial Adaptive Controllers Based on Frequency Response Techniques," *Automatica*, 27(4):599-609 (1991).
International Search Report in PCT/US01/19706 dated Oct. 23, 2001.
International Search Report in PCT/US98/19375 dated Feb. 5, 1999.
International Search Report in PCT/US98/19430 dated Jan. 5, 1999.
Jadbabaie et al., "Coordination of Groups of Mobile Autonomous Agents Using Nearest Neighbor Rules," *IEEE Transactions on Automatic Control*, 48(6):988-1001 (2003).
Liberzon et al., "Basic Problems in Stability and Design of Switched Systems," *IEEE Control Systems Magazine*, pp. 59-70 (1999).
Liberzon et al., "Stability of switched systems: a Lie-algebraic condition," *Systems and Control Letters,*, 37:117-122 (1999).
Morse et al., "Applications of Hysteresis Switching in Parameter Adaptive Control," *IEEE Transactions on Automatic Control*, 37(9) (1992).
Morse, "A Bound for the Disturbance-to-Tracking—Error Gain of a Supervised Set-Point Control System," in *Perspectives in Control: Theory and Applications*, pp. 23-41, Dorothee Normand-Cyrot (ed.), Spring Verlag, New York, (1998).
Morse, "Control Using Logic-based Switching," in *Trends in Control: A European Perspective*, Alberto Isidori (ed.), Springer Verlag, New York (1995).
Narendra et al., "Adaptive Control Using Multiple Models", *IEEE Transactions on Automatic Control*, 42(2):171-187 (1997).
Pait et al., "A Cyclic Seitching Strategy afor Parameter-Adaptive Control," *IEEE Transactions on Automatic Control*, 39(6) (1994).
Search Report under Section 17 for Application No. GB0719216.4, dated Dec. 19, 2007.
Search Report under Section 17 issued in GB0619591.1 application by United Kingdom Patent Office on Jan. 29, 2007.
Search Report under Section 17(5) issued by the United Kingdom Patent Office on Aug. 18, 2004 for GB Application No. 0408598.1.
Search Report for Application No. GB0817813.9, dated Jan. 20, 2009.
Chen et al., "Interactive On-line Optimization System", Mineral Processing Research Institute—Louisiana State University (2001).
European Search Report and Search Opinion for Application No. 08165431.1, dated Sep. 9, 2010.
English-language translation of First Chinese Office Action for Application No. 200610131873.1, dated Jan. 15, 2010.

English-language translation of Second Chinese Office Action for Application No. 200610131873.1, dated Aug. 13, 2010.

Examination Report for Application No. GB0619591.1, dated Jun. 18, 2010.

Examination Report for Application No. GB0719216.4, dated Oct. 28, 2010.

Harris, "Assessment of Control Loop Performance", *The Canadian Journal of Chemical Engineering*, 67:856-861 (1989).

Henson, "Nonlinear Model Predictive Control: Current Status and Future Directions", *Computers and Chemical Engineering*, 23:187-202 (1998).

Neitzel et al., "A Simple Real-Time Process Control Experiment Using Serial Communication," John Wiley & Sons Inc., pp. 101-104 (2001).

Ramakrishnan et al., "Prediction of Process Parameters for Intelligent Control of Tunnel Freezers Using Simulation", *Journal of Food Engineering*, 65:23-31 (2004).

Robinson, "Autonomous Design and Execution of Process Controllers for Untended Scientific Instruments", ACM (1997).

Communication Enclosing a European Search Report and European Search Opinion of Extended European Search Report for European patent application No. 08165431.1 dated Sep. 9, 2010.

\* cited by examiner

METHOD AND APPARATUS FOR INTELLIGENT CONTROL AND MONITORING IN A PROCESS CONTROL SYSTEM

RELATED APPLICATIONS

This is a regular-filed application which is based on and claims priority to U.S. Provisional Patent Application Ser. No. 60/976,379, entitled "Method And Apparatus For Intelligent Control And Monitoring In A Process Control System," which was filed on Sep. 28, 2007, the entire disclosure of which is hereby incorporated by reference herein. This application further claims continuation-in-part priority to U.S. patent application Ser. No. 11/243,862, entitled "Process Model Identification in a Process Control System," which was filed on Oct. 4, 2005, the entire disclosure of which is hereby incorporated by reference herein.

TECHNICAL FIELD

The present disclosure relates generally to process control systems and, more particularly, to a system architecture for process model identification and application in adaptive process control systems with learning algorithms embedded in the native process control system.

BACKGROUND

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, and uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Fisher Rosemount Systems, Inc., headquartered in Austin, Tex., use function blocks or groups of function blocks referred to as modules located in the controller or in different field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-integral-derivative (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control (FLC) function block, and an output block, such as an analog output (AO) function block.

Control routines, and the function blocks that implement such routines, have been configured in accordance with a number of control techniques, including PID control, fuzzy logic control, and model-based techniques such as a Smith Predictor or Model Predictive control (MPC). In model-based control techniques, the parameters used in the routines to determine the closed loop control response are based on the dynamic process response to changes in the manipulated or measured disturbances serving as inputs to the process. A representation of this response of the process to changes in process inputs may be characterized as a process model. For instance, a first-order parameterized process model may specify values for the gain, dead time, and time constant of a self-regulating process or values for integrating gain and dead time of an integrating process.

One model-based technique, model predictive control (MPC), involves a number of step or impulse response models designed to capture the dynamic relationships between process inputs and outputs. With MPC techniques, the process model is directly used to generate the controller. When used in connection with processes that experience large changes in process dead time, process delay, etc., the MPC controller must be automatically regenerated using the models to match the current process condition. In such cases, a process model was accordingly identified at each of a number of operating conditions. The introduction of multiple process models and the requisite automatic generation of the controller to matching the current process condition undesirably increased the complexity of the process control system.

Process models have also been used to set tuning parameters of PID and other control schemes using adaptive control techniques, where the tuning of the PID (or other) controller is generally updated as a result of changes in the process model and a user-selected tuning rule. See, e.g., U.S. Pat. Publication No. 2003/0195641 entitled "State Based Adaptive Feedback Feedforward PID Controller" and U.S. Pat. No. 6,577,908 entitled "Adaptive Feedback/Feedforward PID Controller," the entire disclosures of which are hereby expressly incorporated by reference herein.

A process control system generally has the ability to tune process loops and provide some kind of performance monitoring. However, as conditions change and process equipment degrades the existing tuning results in inefficient operation. While some manufacturers have tried to address this problem by layering complex applications on top of the control system, the continuing sophistication of hardware and software provides the ability to embed more and more functionality in the native control system itself. The next generation intelligent control system provides embedded learning algorithms that constantly observe every loop and every device of the system, thereby enabling intelligent monitoring, diagnostics, and advanced tuning, automatically. The algorithms learn and remember the process models, and, as conditions change, re-learn the process automatically. This information can then be used to evaluate control performance and behavior, and diagnose problems. Finally, the control performance can be improved by advising operators of under performing loops or recommended tuning, and ultimately, by automatic retuning of the loops with continuous adaptive control. An example of automatic process identification in a control system is described in U.S. Pat. Publication No. 2007/0078533 entitled "Process Model Identification In A Process Control System," the entire disclosure of which is hereby expressly incorporated by reference herein. This combination of intelligent control with intelligent devices realizes a control system with predictive intelligence.

SUMMARY

The present disclosure describes a system architecture for a next generation intelligent control system, some of the components of which may include: automatic and independent identification and monitoring algorithms, such as in the online controller; secure and reliable messaging and communication for model and information exchange; a well managed real-time database for storing and retrieving the learned process information; support for automatic learning in the system configuration environment and database; and an easy-to-use and flexible GUI application that provides an insight into the results and recommendations of the embedded intelligence in a consolidated fashion. Since this potentially impacts every piece of the control system, the new architecture may integrate the full functionality into a standard distributed control system (DCS). Some of the features of the integrated approach to intelligent monitoring and control of this technique, as compared to, for example, traditional layered techniques, may include: automatic process learning requiring little or no user intervention; inclusion of all, or almost all, loops for all processes; automatic handling of control system resource management; negating any requirement to disturb the process for additional testing and learning; and providing results and recommendations in a unified and integrated fashion for process operations.

In accordance with one aspect of the disclosure, data gathering and model identification are implemented on the function block level of a controller as a function block plug-in to the control function block and model identification module. The created models may be fetched by a server located on a workstation and transferred to a model database. The adaptive control is implemented as a separate control function block (PID, Fuzzy, etc.), and all algorithms may be embedded into the control function block. One aspect of the functions performed by the function block plug-in and model identification module is a breakup into two independent execution threads. A first execution thread performs data collection, tuning and other real-time tasks in connection with the function block plug-in, and a second execution thread performs a low priority service for process model identification in connection with the model identification module, as model identification is computationally demanding, but not time critical.

In another aspect of the disclosure, an example technique has been disclosed that allows a user to obtain process models, analyze the models and calculate tuning for a variety of control function blocks (PID, Fuzzy, etc.) in a process control system. The technique may be user interactive or automatic (e.g., full adaptive control). An application allows a user to view, analyze and approve models which may be used for adaptive multi-region tuning performed in the controller. Adaptive tuning may work in a fully automatic mode directly in the controller regardless of other components of the system without any interaction from a user. The application may integrate other advanced control products, such as tuning and inspection, to allow a user to diagnose and repair control problems within one application.

BRIEF DESCRIPTION OF THE DRAWINGS

For a more complete understanding of the disclosure, reference should be made to the following detailed description and accompanying drawing figures, in which like reference numerals identify like elements in the figures, and in which:

FIG. 2 is a schematic representation of the controller and workstation of FIG. 1 in accordance with an embodiment in which the controller has a function block plug-in module and a model identification module in communication with the function block plug-in;

Figure 1:
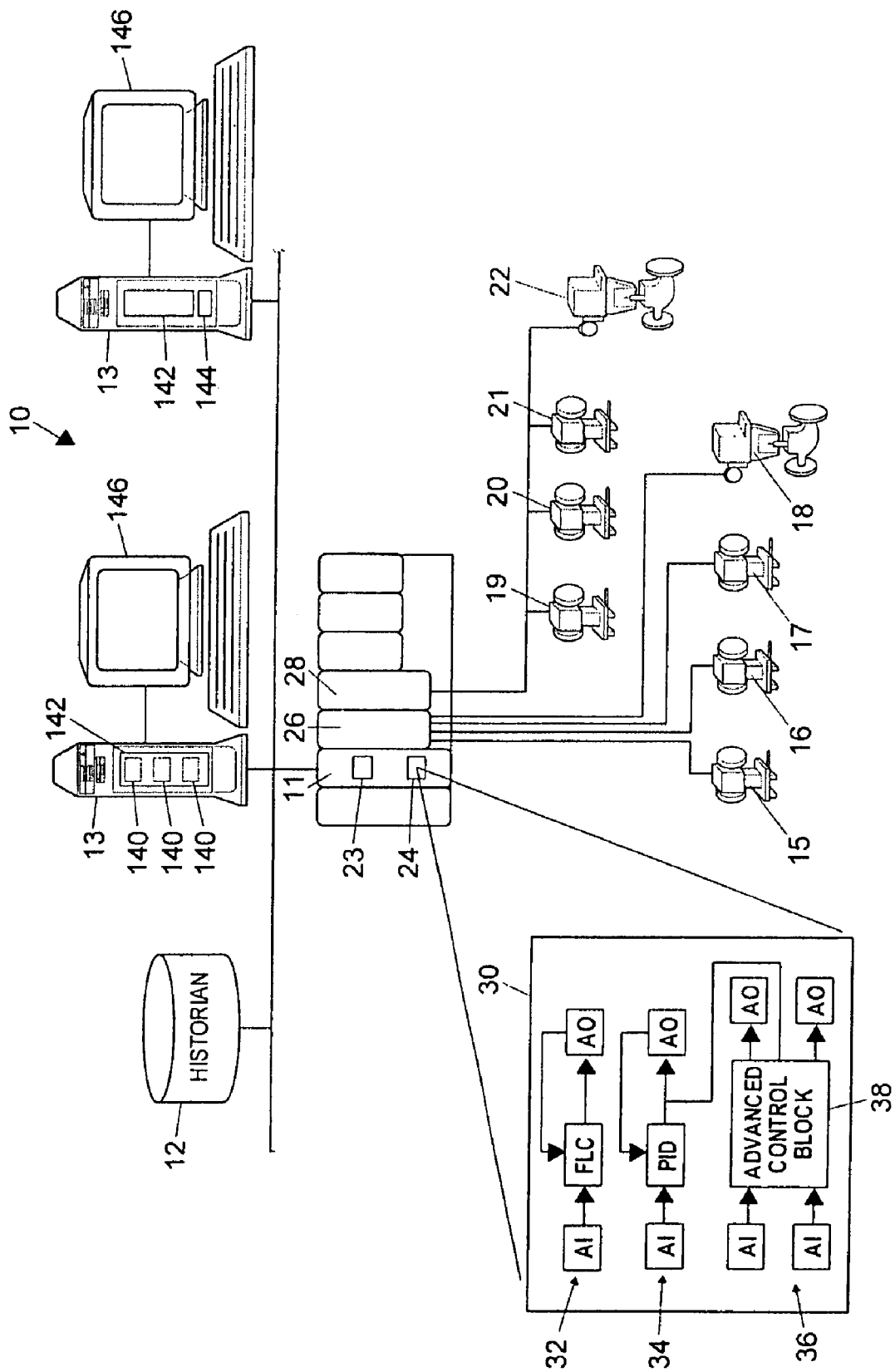
FIG. 1 is a schematic representation of a process control system including a controller configured with one or more control routines in accordance with one aspect of the disclosure.

While the disclosed system and method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DESCRIPTION

Disclosed herein are a process control system architecture and method that implement a technique for automatically and independently identifying (e.g., generating) process models for adaptive process control loops in the process control system and using those process models for intelligent control of the process control system. The operation condition data is gathered and the process models created at the function block level as a function block plug-in to the controller block and model identification service. The system architecture enables the models to be fetched from the controller/model identification service by a workstation, where the models may be viewed, analyzed, approved and used to adaptive multi-region tuning in the controller. The user may be provided with an application via the workstation that integrates other control applications for monitoring and tuning in order to diagnose and repair control problems.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV® controller sold by Fisher-Rosemount Systems, Inc., is communicatively connected to the host computers 13 and to the data historian 12 via, for example, an ethernet connection or any other desired communication network. The controller 11 is also communicatively connected to the field devices 15-22 using any desired hardware and software associated with, for example, standard 4-20 ma devices and/or any smart communication protocol such as the FOUNDATION® Fieldbus protocol, the HART protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11 includes a processor 23 that implements or oversees one or more process control routines (stored in a memory 24), which may include control loops, stored therein or otherwise associated therewith and communicates with the devices 15-22, the host computers 13 and the data historian 12 to control a process in any desired manner. It should be noted that any control routines or modules described herein may have parts thereof implemented or executed by different controllers or other devices if so desired. Likewise, the control routines or modules described herein to be implemented within the process control system 10 may take any form, including software, firmware, hardware, etc. For the purpose of this disclosure, a process control module may be any part or portion of a process control system including, for example, a routine, a block or any element thereof, stored on any computer readable medium. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. While the description of the control system is provided herein using a function block control strategy, the disclosed techniques and system may also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may be any type of model predictive control (MPC) block, neural network modeling or control block, a multi-variable fuzzy logic control block, a real-time-optimizer block, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

As a general matter, the workstations 13 include (either individually, distributed or any other fashion) a suite of operator interface applications and other data structures 140 which may be accessed by any authorized user (e.g., a configuration engineer, operator, etc.) to view and provide functionality with respect to devices, units, etc. connected within the process plant 10. The suite of operator interface applications 140 is stored in a memory 142 of the workstation 13 and each of the applications or entities within the suite of applications 140 is adapted to be executed on a respective processor(s) 144 associated with each workstation 13. While the entire suite of applications 140 is illustrated as being stored in the workstation 13, some of these applications or other entities may be stored and executed in other workstations or computer devices within or associated or in communication with the system 10. Furthermore, the suite of applications 140 may provide display outputs to a display screen 146 associated with the workstation 13 or any other desired display screen or display device, including hand-held devices, laptops, other workstations, printers, etc. Likewise, the applications within the suite of applications 140 may be broken up and executed on two or more computers or machines and may be configured to operate in conjunction with one another.

Figure 2:
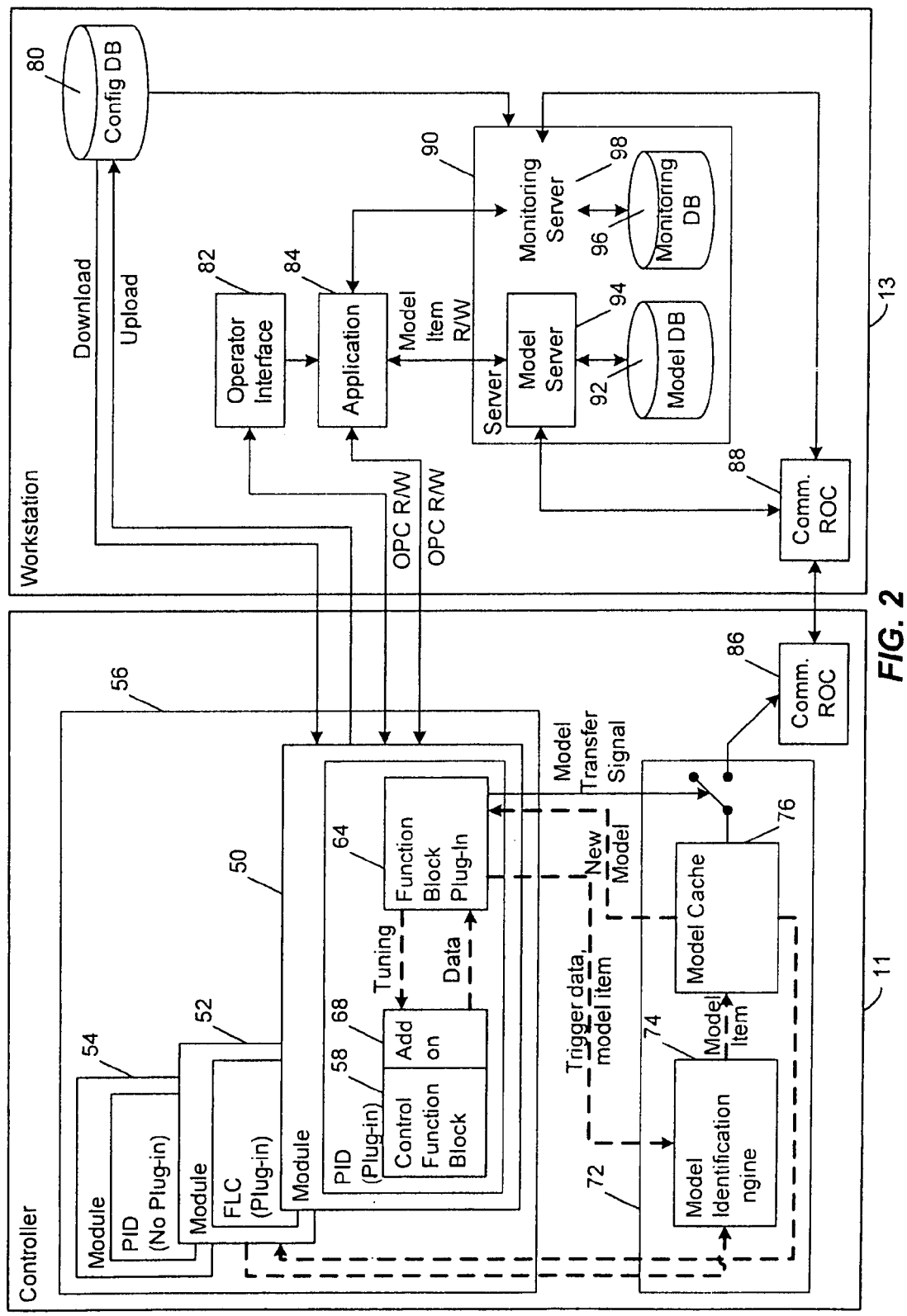

Referring now to FIG. 2, a process control system architecture generally includes a controller 11 and workstation 13, though it should be understood that any number of workstations 13 and controllers 11 may be implemented using the disclosed process control system architecture. The controller 11 may have any number of control modules 50, 52, and 54 that define and implement corresponding process control routines to control the on-line process. Thus, the control modules 50, 52 and 54 may be implemented in connection with an operational environment or mode controlled by a module 56 and generally associated with normal, scheduled control of the process. As described above, each control module 50, 52 and 54 may have any number of function blocks, including control function blocks 58 (not shown in modules 52 and 54), some or all of which may be an adaptive control function block for use in connection with the disclosed technique. The adaptive control function block(s) may include one or more memories or other storage mechanisms to save or store a predetermined number of process models, as disclosed further below.

In addition, one or more of the control modules (indicated with respect to control modules 50, 52) may have a function block plug-in 64 that interfaces with the respective control function block 58 via an interface 68 added on to the control function block 58. In accordance with some embodiments of the disclosed technique, the function block plug-in 64 performs data collection, as well as model and tuning control to calculate tuning variables for the control function block 58 and process model identification control logic to monitor data and conditions for trigger events indicating a process change sufficient for model identification. While an example of the function block plug-in 64 is described in further detail below, in a general sense the function block plug-in 64 provides a non-layered, integrated extension of the control function block and module that it is embedded in. The function block plug-in 64 interacts with the control function block 58 to add the data collection and model identification functions to the native control system without adding a further application layer on top of the process control system. While the function block plug-in 64 may be provided with existing adaptive controllers 11, the function block plug-in 64 is itself adaptive, in that the algorithms, routines and functionality contained therein provide self learning properties to the controller 11. Accordingly, the function block plug-in 64 may be included within any controller 11 (adaptive or non-adaptive) having a control function block to provide adaptive tuning functionality to the controller 11.

The controller 11 may further include a model identification routine or module 72 that identifies and implements process models for the controller 11. Generally, the model identification module 72 is implemented as a subsystem separate from the control modules 50, 52 and 54, and uses the data collected by the function block plug-in 64 to identify (e.g., generate or create) a model of the process when a change in the process is detected. The modeling identification module 72 includes a model identification engine or routine 74 which calculates parameters for a new model based on data collected by the function block plug-in 64. The collection and transfer of data from the function block plug-in 64 may be triggered by a change detected in the process. At some point following the data collection associated with a trigger event, the model identification engine 74 may implement a model identification algorithm or calculation routine, described further below, and store the newly created models, or the parameters thereof, in a model cache 76.

Because the model identification module 72 is implemented in the controller 11, the controller 11 is able to provide models that are updated with each change in the process, such as a change in a process state parameter or other event trigger threshold. In this way, models may be utilized for each part of a process in a process plant that utilizes this type of controller 11, thereby establishing models for each device and/or loop controlled by a controller. Further, the models may be combined or integrated to form models of larger processes, including, but not limited to, units, areas, and the process plant itself, with updates being provided at the controller level.

In some embodiments, the model identification module 72 functionality is provided in a separate, low priority execution thread, as compared to the functionality of the function block plug-ins 64. For example, whereas the function block plug-in 64 may be provided as a high, real-time priority execution thread for real-time data collection and tuning, the model identification functionality is generally more processor-intensive, computationally-demanding and time-consuming. The execution threads may be implemented using user-determined or dynamically-determined (e.g., by the controller 11 or workstation 12) resource management of the controller memory and processor. The separation of the execution threads for the modules 56 and 72, and, more particularly, the separation of the model identification engine 74 and the function block plug-ins 64, places less computational requirements on the module 56, the control modules 50, 52 and 54, and any control blocks thereof. Another example of a low priority service includes an analytical server, which is described in U.S. Pat. Publication No. 2007/0142936 entitled "Analytical Server Integrated in a Process Control Network," the entire disclosure of which is hereby expressly incorporated by reference herein. However, the integration of both modules 56, 72 in the controller 11 at the function block level, enables fully automatic and independent model identification and tuning, without user interaction or intervention at the workstation level.

The separation of modules 56 and 72 also allows some embodiments to provide an option to disable the model identification module 72 and, thus, the model identification engine 74. Disabling the model identification functionality may be useful if, for instance, it is determined that the controller 11 has insufficient memory or time for the calculations and other processing, thereby providing automatic system resource management in the native controller. On a related note, the use of the identified models to provide adaptive control may be also be enabled or disabled on a loop, area, system or controller basis.

Separate model identification functionality also supports the coordination of process input changes. Such coordination is made possible because model identification within the controller is centralized in one process. For example, when no set point changes are being made, the function block plug-in 64 (or other element or routine) may automatically inject changes in the controller output. These changes may be coordinated in a manner to minimize the impact on process operation. These changes may thus be distributed over time.

Separate model identification also means that the processing of data for model identification may be performed during free time for the controller 11, or at any other time deemed suitable by the controller 11, though the provision of separate execution threads for the modules 56, 72 provides for concurrent execution of the respective functions. As a result, the implementation of model identification processing avoids adversely impacting scheduled control functionality provided by, for instance, the module 56. As a result, in some embodiments, the model identification service 72 may be implemented by the controller 11 in the background as the low-priority execution thread, while the process is on-line, and at strategically advantageous times during the scheduled control and other activities undertaken by other modules or components of the controller 11.

In alternative embodiments, the above-described functionalities, some of which are described in greater detail below, may be integrated into a virtual controller for the control system for which the process models are being identified. The virtual controller may be implemented within a memory of the workstation 13 and executed by a processor of the workstation 13. The virtual controller may include and store, for instance, modules reflecting the current configuration of each control loop along with an identification of the respective parameters thereof. That is, the model and diagnostic information generated via the disclosed techniques are saved in a module automatically created for that node. In this way, the virtual controller may be utilized to present information via tuning, diagnostics, etc. in exactly the same manner as would be done in connection with loops implemented in the controller 11.

The controller 11 may communicate with one or more workstations 13, with the control modules 50, 52, 54 each communicating with the workstation 13. In some embodiments, each control module 50, 52 having a function block plug-in 64 maintains communication with a configuration database 80 to communicate and/or exchange information with the controller 11. In particular, the configuration database 80 may implement a configuration list module (not shown) that determines which parameters need to be collected from the controller 11. To that end, the configuration database 80 may include a memory or other storage mechanism for the list data. Stored along with the identified parameters may be a list or other identification of the control blocks or modules for which the models are to be generated. The communication link may provide secure and reliable messaging and communication utilizing encryption and security techniques, as understood by those of ordinary skill in the art.

Referring again to FIG. 1, as a general matter, the workstations 13 include (either individually, distributed or any other fashion) a suite of operator interface applications and other data structures 140 which may be accessed by any authorized user (e.g., a configuration engineer, operator, etc.) to view and provide functionality with respect to devices, units, etc. connected within the process plant 10. The suite of operator interface applications 140 is stored in a memory 142 of the workstation 13 and each of the applications or entities within the suite of applications 140 is adapted to be executed on a respective processor(s) 144 associated with each workstation 13. While the entire suite of applications 140 is illustrated as being stored in the workstation 13, some of these applications or other entities may be stored and executed in other workstations or computer devices within or associated or in communication with the system 10. Furthermore, the suite of applications 140 may provide display outputs to a display screen 146 associated with the workstation 13 or any other desired display screen or display device, including hand-held devices, laptops, other workstations, printers, etc. Likewise, the applications within the suite of applications 140 may be broken up and executed on two or more computers or machines and may be configured to operate in conjunction with one another.

Referring back to FIG. 2, each control module 50, 52, 54 may communicate and/or execute read/write operations with an operator interface 82, which in turn, may be operatively coupled to a specific application or functionality 84 that provides insight into the results and recommendations of the intelligence and functionality embedded in each controller 11. Display interfaces may be provided by the operator interface 82 directed to supporting communications with the controller 11. Such communications may involve or include the configuration and maintenance of adaptive control routines executing in the controller 11. The operator interface 82 may be a third-party interface application provided to support and maintain a communication link with a third-party or legacy process control system. To that end, the operator interface 82 may generate a number of display interfaces to facilitate the configuration of the communication link, maintain and utilize a virtual controller, and otherwise support the interface.

Further display interfaces may be provided by the application 84 directed to supporting communications with the controller 11. Such communications may involve or include the configuration and maintenance of adaptive control routines executed in the controller 11. As is the case throughout the application suite, the display interfaces may take any form, including without limitation dynamos, faceplates, detailed displays, dialog boxes, and windows, and may be configured for display on different display types. In some cases, the application 84 is launched within the context of (or from) the operator interface 82. In the alternative or in addition, the control modules 50, 52, 54 may exchange information directly with the application 84, and the application 84 may be launched or accessed independent of the operator interface 82.

Communication with the operator interface 82 and/or application 84 may involve communication of models utilized by the function block plug-in 64, and may be implemented in a remote manner, and/or by a system layered onto a process control system via an OPC (Open Process Control) or other client interface. To support the broad application of the disclosed techniques, the workstation 13 may include the OPC or other client interface configured to access loop dynamic parameters. Generally, the communication link between the workstation 13 and the control modules 50, 52 and 54 may be established by identifying an OPC server and, in some cases, other communication settings, such as an identification of one or more controller(s) 11 involved in the model identification process. To avoid opening many (e.g., unnecessary) communication ports, such OPC connections may be made using tunneler software.

In addition to communications between the control modules 50, 52 and 54 and the workstation 13, the model identification module 72 may also communicate with the workstation 13 via respective communication services 86, 88, each of which may be provided as a remote communication controller (ROC) service. On the workstation side of the communication, a server 90 is provided for storing models and collected data from the controller 11, and enabling the application 84 to access the models and collected data, such that a user may view, analyze, edit and approve models, and utilize the models to monitor the process.

To this end, the server 90 may be provided as a model database 92 and model server 94, where the model server 94 communicates with the model identification module 72 of the controller 11 to receive and store models or model parameters identified by the model identification module 72. Specifically, a message may be communicated from the model identification module 72 to the model server 94 to inform the model server 94 of new models or model parameters created by the model identification service. The model server 94 may the fetch the model or model parameters from the model identification server 72, and store the same in the model database 92. Generally, the model created by the modeling identification module 72 may be the same as that used by the function block plug-in 64 to tune the controller 11.

The server 90 may also be provided as a monitoring database 96 and monitoring server 98, where the monitoring server 98 communicates with the model identification module 72 of the controller 11 to receive and store operating condition collected by the controller 11. As with the models above, a message may be communicated from the model identification module 72 to the monitoring server 98 to inform the monitoring server 98 of new attributes regarding the process, including data used to identify a model. The monitoring server 98 may then fetch the collected data from the model identification server 72, and store the data in the monitoring database 96. As such, the model server 94 and the monitoring server 98 may be updated or informed of the existing model or model parameters being utilized by the controller 11, and the collected data used to identify those models or model parameters.

The operator interface 82 and the application 84 may be provided as one of a suite of applications 140. As described in U.S. Pat. Publication No. 2007/0078533, the suite of applications 140 may include a number of applications, routines, modules, and other procedural elements directed to the implementation of model-based monitoring and management of the control system 10. The applications, routines, modules and elements may be implemented via any combination of software, firmware and hardware and are not limited to the exemplary arrangement disclosed in U.S. Pat. Publication No. 2007/0078533. For instance, one or more applications may be integrated to any desired extent.

Generally, the application 84 provides exportation and archiving of data collected by the function block plug-ins 64, as well as exportation and archiving of models identified by the model identification engine 74 and stored in the function block plug-in 64. In addition, the application 84 may utilize this data and models to perform quality checks on the model, integrate models from different controllers 11 to create larger process models and provide other functionality associated with the use of the identified models.

Using the above controller 11 and workstation 13 architecture, the performance of the process may be improved by identifying underperforming loops, tune controllers and/or loops, perform testing, monitor performance. For example, the controllers 11, and specifically the function block plug-in 64 and model identification module 72, utilize learning algorithms to automatically identify new models based on process changes (either automatic, manual or induced) that trigger the controller 11 to collected the control data (e.g., process input data) and operating condition (e.g., process output data) and calculate a new model or model parameters. The model or model parameters may be utilized by a user of the workstation 13, and of the application 84 in particular, to evaluate performance, identify actual or potential non-linearities and degradations in the process, identify underperforming processes and abnormal process conditions, and recommend tuning adjustments (e.g., tuning parameters). The virtual controller may be used to test the tuning adjustments to predict process performance and analyze the prediction before implementing the tuning adjustments.

The model or model parameters may also be utilized by the controller 11 for adaptive tuning and intelligent performance monitoring by the controller 11 itself. By embedding this functionality, the model identification functionality and data collection functionality in the controller 11, process communications are reduced, thereby placing less of a workload placed on the process communications, such as communications between the controller 11 and workstation 13 (e.g., OPC).

Figure 3:
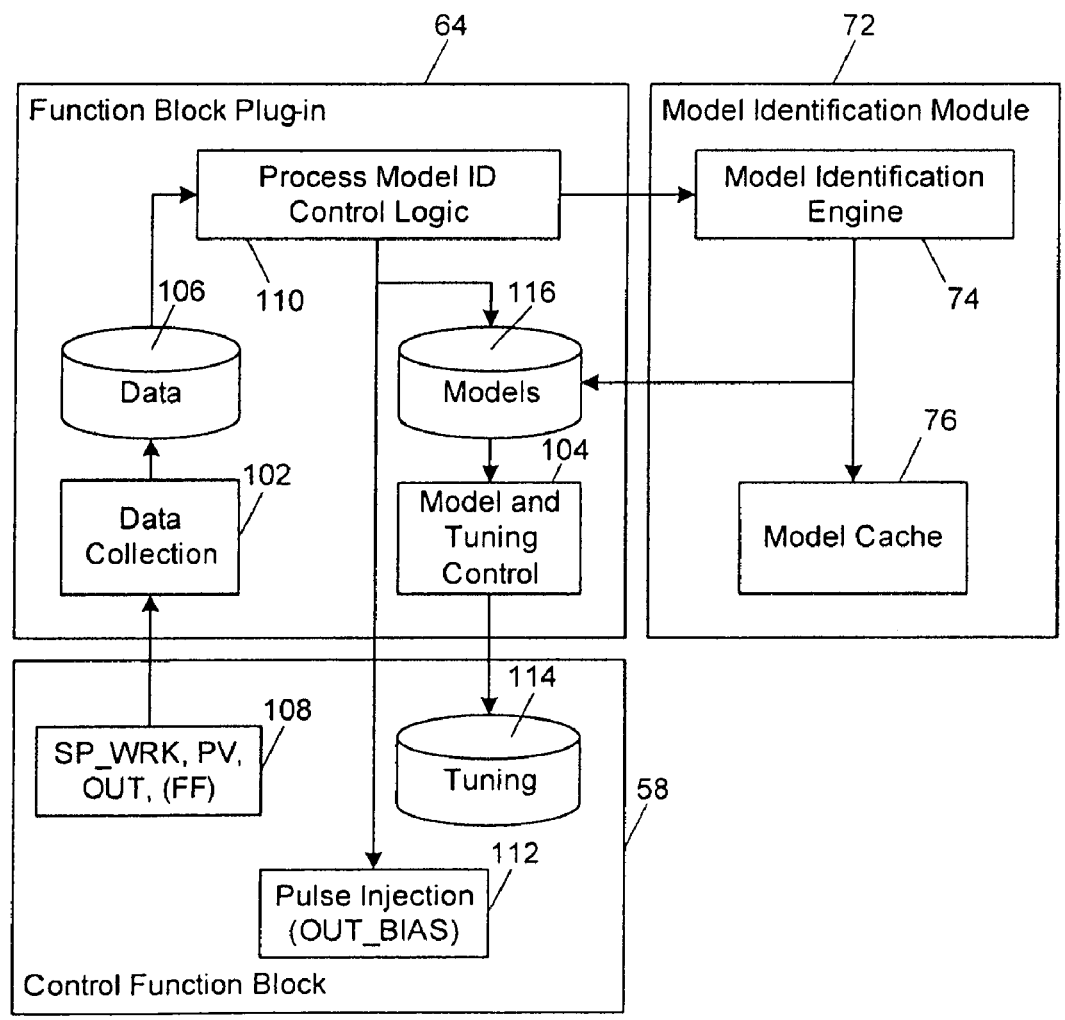
FIG. 3 is a schematic representation of the controller of FIG. 1 in accordance with an embodiment in which the function block plug-in of FIG. 2 is shown in greater detail.

Referring now to FIG. 3, the controller 11, and, more particularly, the interaction between the control function block 58, the function block plug-in 64 and the model identification module 72, is shown in greater detail. As mentioned above, the function block plug-in 64 may perform various functions, including data collection 102, as well as model and tuning control 104 to calculate tuning variables for the control function block 58. For example, parameter values and other operating condition data are passed from the control function block 58 to the function block plug-in 64 in response to a trigger event. Generally speaking, the parameter values and other operating condition data are made available (or otherwise communicated) during execution of the control module(s) and function block(s) thereof. Because such execution may be rather continuous during the scheduled process control activities, the communication of the parameter values and other operating condition data may also be continuous.

In accordance with some embodiments of the disclosed techniques, parameter values and other operating condition data are passed from the control modules 50, 52 and 54 to the data collection function 102 of the function block plug-in 64.

Like the function blocks, the data collection function 104 may, but need not, be implemented in object-oriented fashion as an object(s) (or object entity). Regardless of its structure, the data collection function 102 of the function block plug-in 64 may include one or more routines defining the procedures to be implemented in the data collection 102, including any data handling procedures. More generally, the data collection function 102 may include one or more routines to support the automatic collection, gathering, receipt or other handling of the parameters and other operating condition data. The routines of the function block plug-in 64 may thus coordinate, support or implement the storage of the collected data in, for instance, one or more registers or other memories 106. The procedures executed by the data collection function may include determining when to collect the data from the control modules 50, 52 having the plug-in 64, as described below.

More generally, the data collection function 102 may include one or more routines to support the automatic collection, gathering, receipt or other handling of the parameters and other operating condition data. To the extent that the automatic collection or other handling of the parameters and data is implemented by the data collection function 102, requirements are placed on the module 72 or on communications with the workstation 13 or any elements thereof.

In some embodiments, the parameter and other data 112 (e.g., working set point (SP_WRK), controller input (PV—process variable), controller or function control block output (OUT), feedforward (FF), etc.) may be passed from the control function block 58 to the data collection function 102 automatically whenever a control function block 58 executes. In this sense, the data collection module 102 may be implemented continuously to support the data collection procedure at any time during operation of the process. During those times when control is not scheduled to execute, the data collection function 102 may then examine the collected data to determine if a process model should be generated (e.g., created or identified). In alternative embodiments, the controller 11 may examine or otherwise process the collected data periodically or in some other scheduled manner.

The data collected by the data collection function 102 may generally include values for the process inputs and outputs or the operating set point for a particular control loop implemented by the controller 11 (or, more generally, the process control system 10). For each of these parameters, values are collected and stored over a time period beginning before a trigger event and lasting until steady state is reached. In some cases, the trigger event may involve the detection by, for instance, the data collection function 102 of a change in the process input or set point.

In order to detect or cause event triggers, control data collection, control model identification and process model identification results, the function block plug-in 64 includes a process model identification control logic 110, which may be provided as a routine stored in a memory of the function block plug-in 64. Generally, the process model identification control logic 110 provides monitoring of operating condition data and monitoring of conditions in the process for trigger events indicating a process change sufficient to identify a new process model. In some cases, what constitutes a trigger event may depend on the operational mode of the control loop. Generally, there are two significant indicators of process change which occur during normal plant operation: a set point change as a result of an operator action or master loop control, and a controller output change (or change in back calculation signal, BKCAL_IN,) as a result of an operator action or block override of the controller output. These events are generally indicative of a process about to change or a process that has just started to change, and trigger the collection of operating condition data of the process, including the process response to the trigger event.

When a control loop resides in an "automatic" mode of operation, the loop is continuously adjusting the controller output (i.e., the manipulated process input) to maintain a process output (i.e., the controlled parameter of the loop) at an operator-specified set point. Thus, in automatic mode, a change in the set point will constitute a trigger to analyze the change in process inputs and outputs and, thus, to develop a model. If the operator or master loop control never (or rarely) changes the set point and the loop remains in automatic mode, then a small change 112 (e.g., Pulse Injection (OUT_BIAS)) may be injected in the controller output to excite the process so that there is a trigger to create a model. In one embodiment, the injected change may be implemented after a configured period of time expressed as a fraction of the time to steady state (TSS).

The three above-described trigger events may be used for the development of feedback models. For feedforward model identification, the trigger event may be a change in the feedforward input value, and the process model identification control logic 108 may detect changes in measured disturbances in the process. This functionality is maintained in the process model identification control logic 110 to prevent feedback path identification when significant feedforward changes occur.

Figure 4:
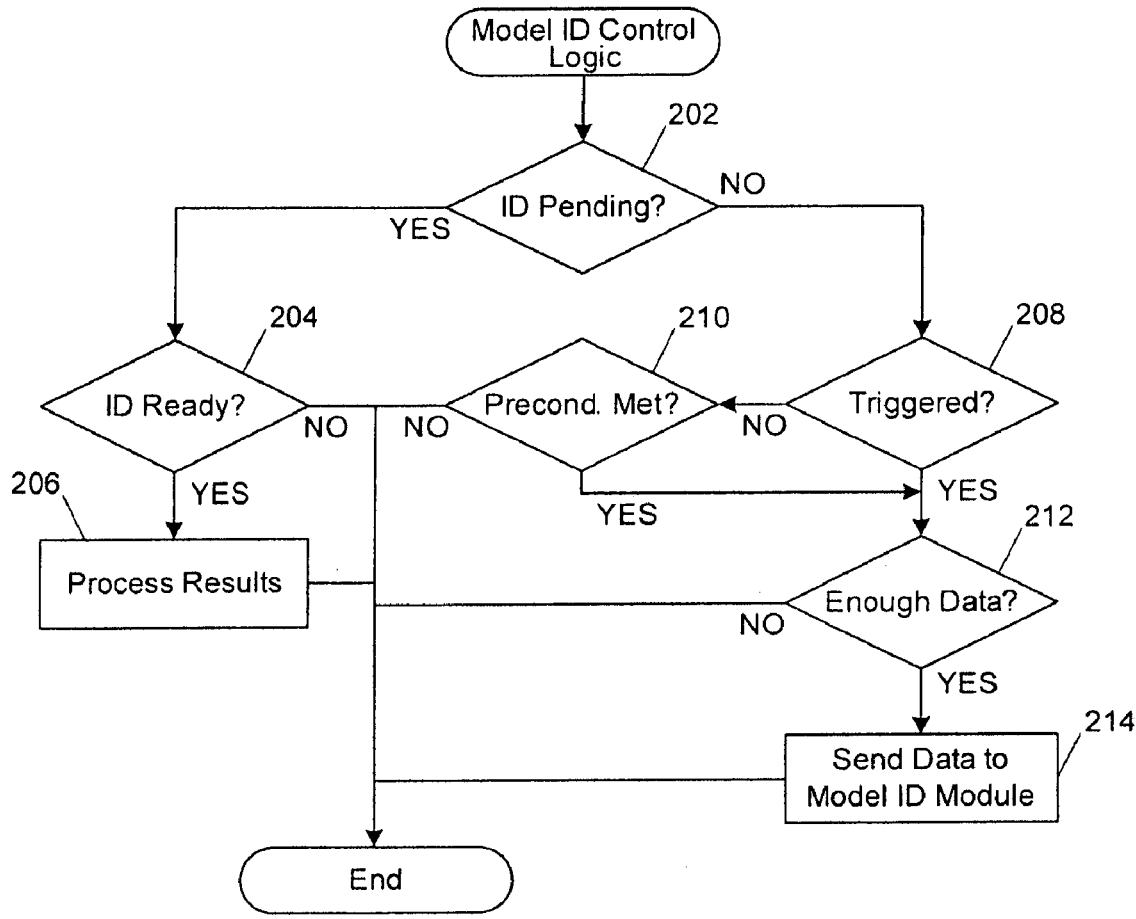
FIG. 4 is a flowchart representation of a model identification control function performed by a model identification control logic executed in the function block plug-in of FIG. 3.

FIG. 4 is a flowchart of an exemplary routine executed by the function block plug-in 64 according to the process model identification control logic 110. Generally, when proper conditions and changes are detected, the process model identification control logic 110 sets the initial process model identification parameters based on controller tuning or based on values associated with a process state parameter input. The process model identification control logic 110 may then invoke the data collection and model identification. Upon receiving the model identification results, the process model identification control logic 110 may analyze the results for allowable ranges for gain, time constant and dead time if the process is a self-regulating process or for integrating gain and dead time if the process is an integrating process, where the allowable ranges may be user configurable. Thereafter, the tuning 114 of the control function block 58 may be set by the model and tuning control logic 106 based on the identified model and selected tuning rules.

Specifically, and referring to FIG. 4, the process model identification control logic 108 first determines if a process model is pending at a block 202. That is, the process model identification control logic 110 determines whether model identification has already been initiated based on, for example, a previously detected trigger event and is awaiting the results from the model identification module 72. As discussed further below, the model identification module 72 identifies models or model parameters based on the data collected by the function block plug-in 64 in response to the triggered event.

If model identification is already pending, as determined at block 202, the process model identification control logic 110 may determine whether the model results are ready at a block 204, which may be signified by receipt of a model or model parameters from the model identification module 72 or by receipt of a signal from the model identification module 72 indicating the model results are available to be fetched from the model cache 76. Once the model results are ready, as determined at block 204, the process model identification control logic 110 may process the model identification results at a block 206. For example, the process model identification control logic 110 may perform initialization to (re)calculate the time to steady state in order to determine whether the model results should be utilized. For example, if the change in the time to steady state is more than a predetermined threshold (e.g., 30%) in comparison to the previous time to steady state, the new model is used. The change in the time to steady state may further initiate procedures for recalculating all variables dependent on the time to steady state, such as data collection sampling and diagnostic filter constraints.

Referring back to block 202, if model results are not pending, the process model identification control logic 110 may wait for a trigger event at a block 208. As discussed above, there may be different trigger events, including set point changes, controller output changes, or pulse injection 112. The pulse injection control may be provided as an optional feature that is initiated if the function control block 58 is in an automatic mode and a timer reaches a predetermined time, which may be user-configurable. The timer may be reset every time there is any active trigger or identification results are pending.

The configured pulse amplitude may also be a precondition for initiating the pulse injection 112. For example, the pulse injection 112 may only be initiated if the pulse amplitude multiplied by the then-identified process model gain is greater than five times the capability standard deviation. The pulse injection parameter 112 parameter for the control function block 58 may be set to a user-configured value for the duration of the time to steady state multiplied by a predefined constant (e.g., 0.1). In one embodiment, the pulse injection parameter 112 parameter may not be visible to the user and may be written through a special write interface. The number of samples to collect may be set to the time to steady state and from this point the process model identification control logic may be executed the same as for any other trigger.

While the process model identification control logic 110 may detect trigger events at block 208, in order to start a new model identification cycle, the process model identification control logic 110 may implement a set of preconditions at a block 210 in addition to requiring that no model results are pending. The preconditions may include, for example, setting a disable model identification input to false, filling buffers 106 with valid data from the data collection, checking that the trigger event options are selected for the particular control function block mode (e.g., automatic or manual), requiring that a sufficient change must be detected in response to a pulse injection (if a pulse injection is utilized) and that all data has been collected if a previous trigger event occurred. In addition, the preconditions may require that once the function block plug-in 64 is installed or downloaded to the controller 11, an identification lock timer is started (with time set to the time to steady state) to let the controller 11 and process settle for some time before identifying a model based on a trigger event. This helps to avoid false positives, where trigger events are detected in response to the inclusion of the function block plug-in 64, as opposed to a set point change, pulse injection, etc. The identification lock timer expires unless a user writes a request to initialize the buffers 106 with the most recent value (as if process would be in steady-state) and validates all values.

These preconditions may be established and verified at block 210 provided that a trigger event has not already been detected, as determined at block 208. However, if the preconditions are fulfilled then the process of detecting trigger events may proceed. The data buffer 106 is scanned by the process model identification control logic 108 in search for minimum and maximum operation condition values over the time to stead state. If multiple buffers 106 are provided or the buffer 106 is divided into multiple sections, the selection of buffer or buffer section may based on control function block mode and/or trigger event type in the case of multiple or divided buffers (e.g., automatic mode, manual mode, working set point, function block output, etc.). For example, In an automatic mode, the working set point (SP_WRK) level of change may be required to be greater than five times the capability standard deviation. The difference between the time to steady state and the recorded time may determine how many more samples are used before sending the collected data to the model identification module 72. For the automatic mode, a working set point buffer may be search, and for manual mode (or for back calculation) a function block output buffer may be searched. The search may start from the oldest sample and proceed towards the most recent. If a sufficient change (which may be user configurable) is detected, the last tested sample time is recorded.

Once the trigger event is detected at block 208, the process model identification control logic 110 and the data collection module 102 communicate in any desired fashion to support the data collection. More specifically, the control loops implemented by the control modules may continuously provide access to the data or otherwise make the data available. As a result, data collected for some time before the trigger event may also be analyzed to determine the process model. For example, a PID control loop for which data is collected may provide access to the current data values for the process variable used in the block execution (e.g., PV), the block output value (e.g., OUT), the feedforward control input value (e.g., FF_VAL), the set point, and any one or more parameters that indicate the loop mode of operation. In some cases, the data collection function 102 may facilitate the selection of the parameter or other data values. Alternatively or in addition, the process model identification control logic 110 may include a configuration list block(s) that determines which parameters need to be collected or retrieve the list data from the configuration database 80 or the workstation 13.

Once enough operating condition data and control data has been collected in order to gauge the response of the process to the trigger event and identify a model, as determined at a block 212, the collected data may be sent to the model identification module 72 at block 214.

Figure 5:
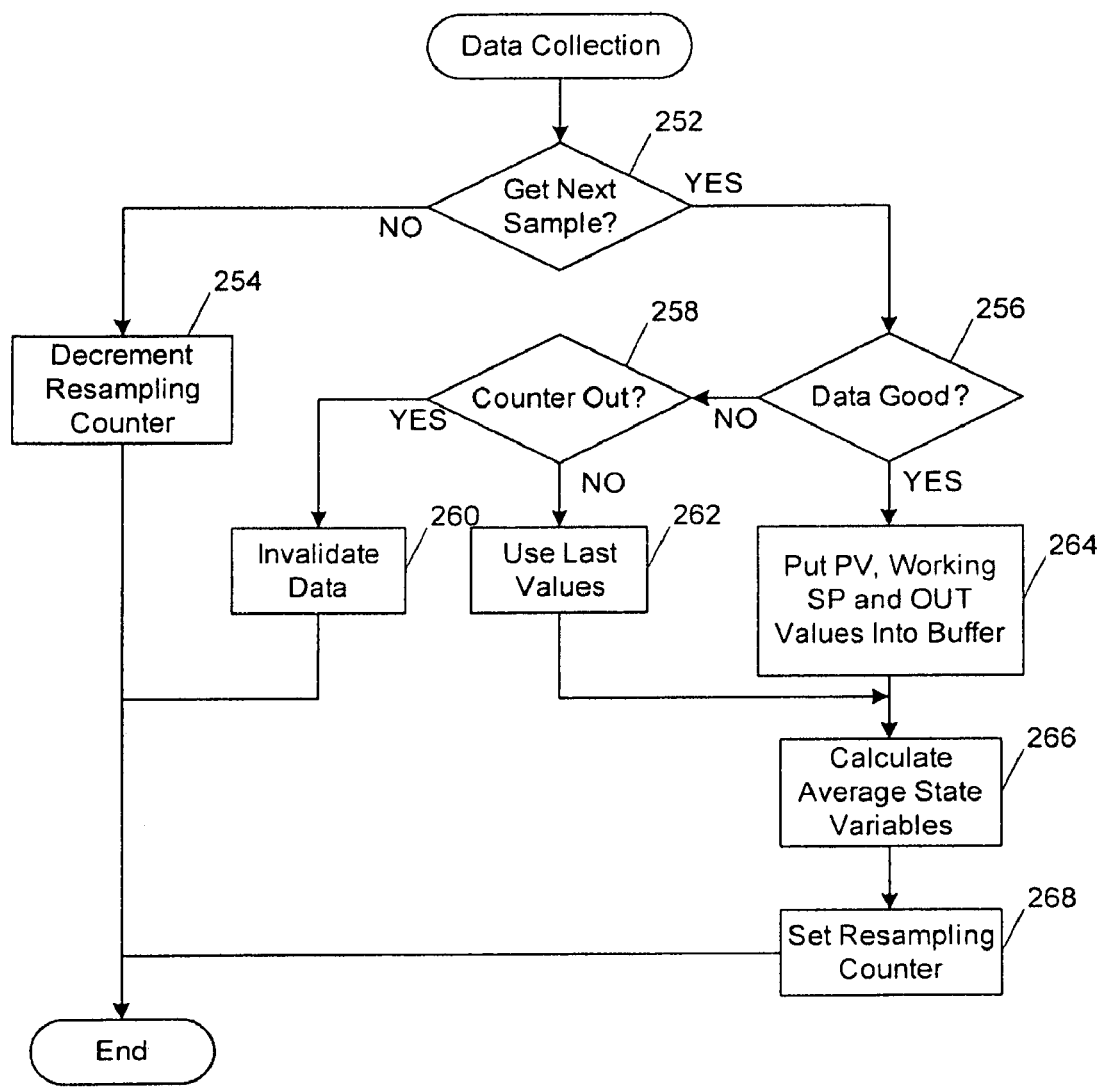
FIG. 5 is a flowchart representation of a data collection function performed by a data collection logic executed in the function block plug-in of FIG. 3.

FIG. 5 is a flowchart of an exemplary routine executed by the function block plug-in 64 according to the data collection function 102. Generally, the data collection function 102 reads data from the controller input (PV—process variable) to collect the control data used to control the operation of the process. The data collection function also read data from the controller output (OUT or BKCAL_IN) to collect the operating condition data relating to the condition of the process in response to the change associated with the trigger event. The control data and operating condition data is stored in the buffer 106. In one embodiment the buffer 106 may be a circular buffer. The circular buffer 106 may contain all needed signals in one class, which may save on execution and memory usage (e.g., all values may be added at once with same buffer pointers, sizes and valid samples). From the standpoint of implementation maintainability, the buffer 106 may be instantiated for each signal separately, so if another buffer is utilized, there are no changes in buffer functions.

At the function block plug-in 64 instantiation, a fixed maximum buffer size may be reserved. The buffer size may be defined by the time to steady state based on the current model clamped by minimum time to steady-state and the execution period of the control function block (e.g., TSS/exec_period).

In the case when the calculated size exceeds the buffer limit, the data collection period may be raised, for example, by lowering the scan rate. In such a case, a new collection period and buffer size may be calculated, and the values stored for identification and tuning calculations. After identifying a new model, if a change in buffer size may be required (e.g., based on a new time to steady state calculation), and current data may be invalidated (all buffers). In some embodiments, a different algorithm may be utilized that excludes data invalidation.

Referring to FIG. 5, and beginning at a block 252 the data collection function may determine whether to collect another sample of the control data and operating condition data based on a trigger event detected by the process model identification control logic 110. For example, upon detecting a trigger event, the process model identification control logic 110 may signal or otherwise direct the data collection function 102 to begin collecting a new sample of the controller input and output data. A resampling counter may be decremented at a block 254, if the data collection function 102 directed to collect data.

Upon being directed to collect a new sample of data, the routine may collect the data at block 252, and perform a quality check on the collected data at a block 256. For example, the quality check at block 256 may check for one or more of the following: limited function block process variable, which indicates no real information on the process; bad process variable status; and controller output approaching limits by a predefined distance. If one or more of these events occur, as determined at block 256, a counter may be incremented and the value of this counter may be check at a block 258. The counter may indicate the number of bad data values within the collected data, and if the counter reaches a predetermined threshold (or is decremented from a predetermined threshold to zero) as determined at block 258, the whole of the collected data sample may be invalidated at a block 260. If the counter has not reached the threshold, the routine may use the last values of the collected data for the model identification.

Referring again to block 256, if the data passes the quality check, the collected data is stored in the buffer 106. As partly indicated above, the input and output of the controller working set point and feedforward buffers may be created. The set point buffer may be used for trigger events. The feedforward buffer may be used for preventing false identifications, and in one example a feedforward path identification requirement may be included, which may be used also for process model identification.

In order to allow a user to identify nonlinearities in process and support multi-region adaptive control, state inputs data may also be processed. In one example, there are four types of state inputs: output, PV, working set point and user-defined. The data collection function 102 may also calculate running averages over the time to steady state of state input signals (state variable parameters) at a block 266. The averages may be saved with the collected data sent to process model identification service. The following equation describes an example of the average calculations:

$$\text{state\_avg}_i = \text{state\_avg}_{i-1}\left(1 - \frac{1}{\text{data\_buffer\_size}}\right) + \text{state\_value}\left(\frac{1}{\text{data\_buffer\_size}}\right) \quad \text{(equa. 1)}$$

After calculating the running averages of the state variable parameters, the resampling counter is reset at a block 268.

At some point following the data collection associated with a trigger event, the model identification module 72 may implement a model identification algorithm or calculation routine, which is now discussed. Generally, after detecting a trigger event and collecting a sufficient amount of data, the contents of the buffer(s) 106 and other parameters are passed as a class pointer to the model identification module 72, and specifically the model identification engine 74. The collected data may be queued to await model identification, where the queued data is a copy of the collected data from function block plug-in 64. This allows proceeding with data collection which is significant for processes with a small number of trigger events and/or processes with very long time to steady state.

The model identification module 72 calls a generate function which may be a member function of a class containing all data. The generate function contains the process model identification algorithm and is used by the model identification engine 74 to identify new parameters for the model. Generally, after a model has been identified, the model results are passed to the function block and then through the ROC service 86, 88 to the server 90. In the case model identification module 72 has reached its capacity (no free slot in tasks queue), the request for model identification from the process model identification control logic 110 may be rejected.

The function block plug-in 64 generally utilizes minimal or no configuration from a user, so most of the parameters may be calculated based on initial tuning (e.g., gain, rate and reset). Full initialization may be performed after a control function block 58 or the function block plug-in 64 has been downloaded for the first time or is otherwise not initialized. For example, if the control function block 58 or function block plug-in 64 is re-downloaded without uploading parameters first, full initialization may be performed. A user may also call full initialization during a regular block operation via the workstation 13.

As a starting point for setting up initial model values, limits, time to steady state (TSS) and TSS_MIN controller tuning and block scan rate may be used. A default value for TSS_MIN may be 0, so when the control function block 58 or function block plug-in 64 is downloaded and TSS_MIN is equal to zero, full initialization may be utilized. Otherwise, some initial values may be based on TSS_MIN.

Operating regions are initialized with the model parameter values and corresponding high and low limits. Identification of these model parameter values is discussed further below. Each operating region may have status bits, with one of the status bits indicating if a model for the region was identified. The initialization procedure applies calculated initial values to all operating regions if no models were identified earlier. In the case that a model of one or more of the operating regions was identified, initial values may be propagated to non-identified ones.

Time to steady state might be initialized in two ways: (1) from an initialized model or from models already identified. Configuration default for TSS and TSS_MIN may be set to zero. If one of those attributes is not zero, then the attribute was set by user or was uploaded previously, and therefore does not require any initialization. In the case that no models for any of the regions were identified, rules shown previously should be applied using initialized model values instead of models stored in regions.

Figure 6:
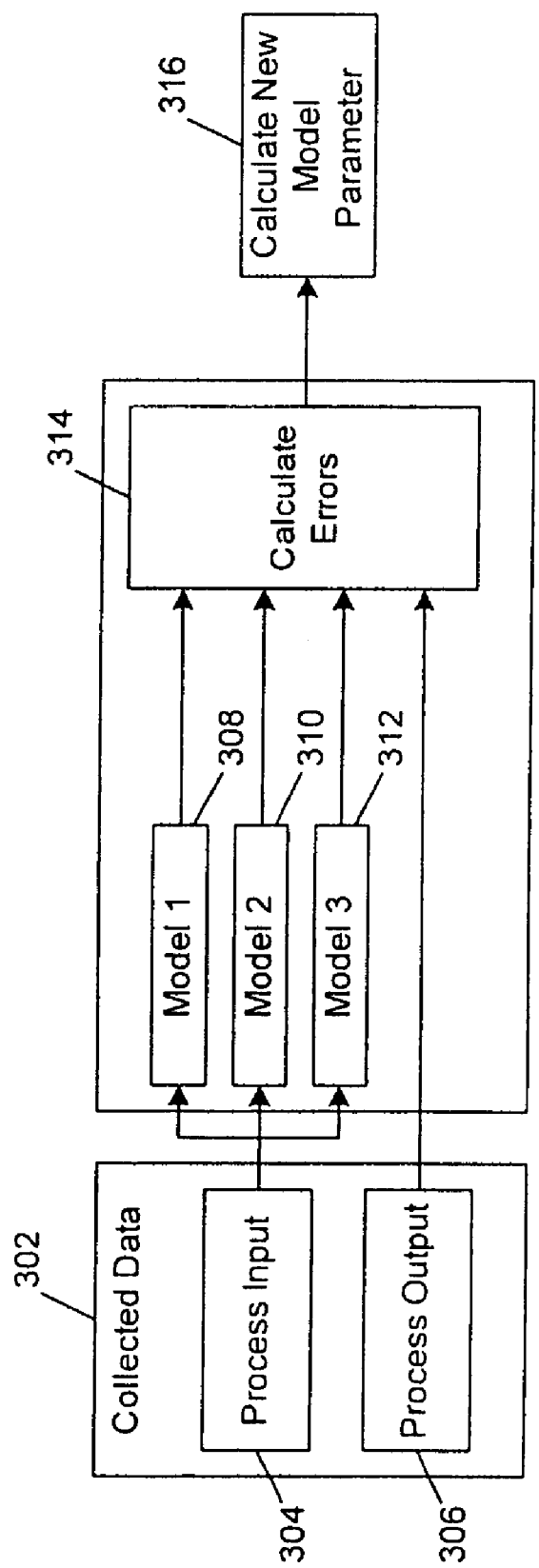
FIG. 6 is a schematic representation of a model identification as performed by the model identification module of FIG. 2.

FIG. 6 is a block diagram of an exemplary depiction of the model identification algorithm or calculation routine as utilized by the model identification algorithm to identify model parameters (and hence models) based on the collected data from the function block plug-in 64. The model identification algorithm or calculation routine of FIG. 6 may be implemented by a Multi-Model Switching and Parameter Interpolation algorithm, and a function block may utilize a modified version of the algorithm identifying one model parameter at the time. The process models identifies according to the techniques disclosed herein, may, but need not, be associated with operating regions (e.g., Region 1, Region 2, etc.,). The process models may also be identified in pairs in accordance with the control scheme of the function block. In this exemplary case, each region is determinative of a pair of process models in support of both feedback and feedforward processing. Upon selection of the region, the pair of feedback and feedforward models may be utilized to calculate feedback and feedforward tuning parameters, respectively.

Generally, based on input parameters, the algorithm runs a number of identification cycles on the collected data. An identification cycle may be executed for each model parameter being identified. Each identification cycle is a loop, and each loop involves several simulations (Model 1, Model 2, Model 3) of the process. Each simulation has different values for various simulation parameters. The simulation parameters may include gain, time constant and dead time settings for each loop if the process is a self-regulating process, or may include integrating gain and dead time for each loop of the process is an integrating process. Each loop calculates output errors between simulated values and collected operating condition data of the process (e.g., the actual process output). Based on errors new temporary model values are identified. Each model simulation output may be defined by the equation:

$$\Delta y_m(k) = -a\Delta y_m(k-1) + b\Delta U(k-1-hn) \quad \text{(equa. 2)}$$

where $\Delta y_m$ is the change in process model simulation output, $\Delta U$ is the change in process model simulation input, h is the sampling period, and n is the dead time in the samples. The dead time delay is implemented by buffering the process input by a predetermined number of samples. Before using model values (e.g., for gain or time constant) in a model simulation routine, the model values may be recalculated to parameters a and b using the following equations:

$$a = e^{-\frac{h}{\tau}} \quad \text{(equa. 3)}$$

$$b = K_m(1 - e^{\frac{h}{\tau}}) \quad \text{(equa. 4)}$$

where $\tau$ is the model time constant, and $K_m$ is the model gain. In the case of an integrating process a may be set to one and b may be set to an integrating gain divided by the data collection sampling period.

Referring to FIG. 6, the collected data 302 includes both the control data 304 (process input) and the operating condition data 306 of the process in response to the trigger event (process output). The process input used by the control function block 58 to control the process is input to each of a plurality of simulations 308, 310, 312 (Model 1, Model 2, Model 3). Each simulation is a model of the process, and has different simulation parameter values, such as different values for process model gain, process model time constant, and process model dead time if the process is self-regulating or for process model integrating gain and process model dead time if the process is an integrating process. It should be understood that while many of the examples provided pertain to a self-regulating process, instances of an integrating process have also been provided, though the same model identification engine 74 may be used for both process types, and the process type (e.g., self-regulating or integrating) may be selected in the control function block by the workstation 13 and/or user. As such, the particular simulation parameters may depend on the particular process being simulated, and gain, time constant and dead time are provided as examples only.

The output of each simulation 308, 310, 312 corresponds to a simulated output of the process. That is, the output of each simulation 308, 310, 312 simulates the operation condition data of the process being simulated. Each simulation output is compared to the actual process output (e.g., the collected operation condition data of the process), whereby an estimation error is calculated 314 for each simulation output. The estimation error may be an integral of the squared error between the simulation output and process output over the time of the collected data.

Using the estimation errors, the parameters for the model may be identified (e.g., calculated) 316. For example, the model parameters may be calculate using the following equation:

$$P_{new} = \frac{P_A}{E_A\left(\frac{1}{E_A} + \frac{1}{E_B}\right)} + \frac{P_B}{E_B\left(\frac{1}{E_A} + \frac{1}{E_B}\right)} \quad \text{(equa. 5)}$$

where $E_A$ and $E_B$ are the two smallest integrated errors, and $P_A$ and $P_B$ are the parameters used in the simulations corresponding to the two smallest integrated errors. $P_A$ and $P_B$ also correspond to the model parameter $P_{new}$ being calculated. For example, if $P_{new}$ is dead time, then $P_A$ and $P_B$ correspond to the dead time values used in the simulations that generated the simulated process output having the smallest integrated errors $E_A$ and $E_B$, respectively. Accordingly, dead time was at least one of the simulation parameters that was different for each simulation 308, 310, 312. While the above calculation is particularly beneficial in calculating the model parameter, it should be understood by those of ordinary skill in the art that the above calculation may be modified as desired to suite any of a number of different simulation parameters, errors and the like when calculating a model parameter.

In some embodiments, the simulation parameters that do not correspond to the model parameter being identified are the same for each simulation 308, 310, 312. In other words, the simulation parameter that is different for each simulation may correspond to the model parameter being calculated for a particular identification cycle. Accordingly, a different identification cycle may be calculated for each model parameter being identified, and the simulation parameter corresponding to the model parameter being identified is different for each simulation 308, 310, 312, with the remaining simulation parameters remaining the same across each simulation. Accordingly, when a model parameter for dead time is being identified, the simulation parameter for dead time is different for each simulation 308, 310, 312. When gain is the model parameter being identified, then gain is the simulation parameter that is different for each simulation 308, 310, 312. Likewise for time constant, or any other model parameter being identified.

As indicated above, each identification cycle is a sequenced loop, such that the cycle is repeated and iteratively executed using the model parameter identified from the previous iteration of the cycle. Accordingly, when the model parameter is calculated as above, it is used as a simulation parameter to initialize one of the simulations in the next iteration of the cycle. For the first iteration, the model is initialized with the model parameter values of the operating region being identified. However, not all simulations are initialized with the model parameter calculated from the previous iteration. Instead, the simulation initialized using the model parameter from the previous interaction may be referred to as the middle simulation, and additional simulations may be referred to as edge simulations corresponding to the upper and lower limits of the process. The model parameters used to initialize the edge simulations may be identified model parameter multiplied by a range modifier. The range modifier corresponds to the upper and lower limits of the model parameter for the process. The range modifier may be calculated according to the following:

region_modifier$_1$=Range_Squeeze_Const;

region_modifier$_i$=region_modifier$_{i-1}$*n$^{th}$ root (Range_Squeeze_Const, nof_id_cycles);

where:
Range_Squeeze_Const=0.2
i=1 . . . nof_id_cycles
nof_id_cycles=the number of identification cycles The value for the Range_Squeeze_Const is provided as an example only, and may be adjusted as needed.

Each parameter may run through the simulations for predefined number of iterations (e.g., 10). After each iteration, the spacing between each simulated models may be decreased due to the decrease in the range modifier. If the middle model parameter falls out of configured limits, it may be set to that limit. If the low limit is also violated, the edge model parameters may be recalculated as follows: the smaller model parameter is set to half of its low limit value, and the bigger model parameter is set to the low limit plus the calculated earlier initial middle model value multiplied by the range modifier.

Each identification cycle for each model parameter may be executed in a particular order based on the model parameter being identified. For example, in a self regulating process, the identification cycles may be run and model parameters identified in the following order: (1) time constant, (2) dead time, and (3) gain. In an integrating process, the identification cycles may be run and model parameters identified in the following order: (1) dead time, and (2) integrating gain.

Each identification cycle (for each model parameter) may be sequentially executed, such that after identifying the model parameter from one identification cycle, the value of the model parameter is applied as a simulation parameter for the simulations of another identification cycle used to identify another model parameter. For example, using the above order for a self regulating process, once the time constant has been identified though its corresponding identification cycle, the identified time constant may be used in the simulations of the identification cycle used to identify the dead time. Subsequently, once the dead time has been identified, both the time constant and dead time may be used as the simulation parameters when identifying the gain. Once all model parameters have been identified, the cycles start again for a predefined number of times (e.g., 5).

The model parameter results from the model identification functionality discussed above may be clamped by limits and a model quality factor may be calculated. The limit clamps and model quality check may be performed by the model identification engine 74 or by another module, routine or function of the model identification module 72. The model quality factor may be a composite of heuristics and the last three errors for each model parameter. In some embodiments, the quality factor for each parameter may be determined in several steps. First, the minimum (min3error) and maximum (max3error) of the three errors is determined. Based on the calculations above, it is determined whether the middle error (error_middle) is the smallest one. It is further determined whether the biggest-to-smallest error ratio (error_min_max) is higher than 1.75 for a self regulating process or higher than 1.25 for an integrating process. The model quality factor for a model parameter may then be calculated as follows:

$$\text{quality\_factor} = \text{quality\_bias} + \text{quality\_modifier} * \left(1 - \frac{\text{min3}error}{\text{max3}error}\right) \quad \text{(equa. 6)}$$

where quality_bias and quaity_modifier may be calculated according to the table of single model parameter quality factor calculation constants below:

| Condition | quality_bias | quality_modifier |
|---|---|---|
| error_middle & error_min_max are true | 0.4 | 0.6 |
| One of error_middle & error_min_max is true | 0.2 | 0.5 |
| error_middle & error_min_max are false | 0.1 | 0.2 |

It should be understood by those of ordinary skill in the art that the values provided above for error_min max, quality_bias and quality_modifier are examples only, and may be adjusted as needed.

The final quality factor for the model identification as a whole is a composite of the quality factors for each model parameter identified from the above-described model identification technique. As an example, the composite of the quality factors for a self regulating process and an integrating process, respectively, may be determined as follows:

$$\text{final\_quality\_factor\_}sr = a*\text{gain\_qf} + c*\text{dt\_qf} \quad \text{(equa. 7)}$$

$$\text{final\_quality\_factor\_int} = a*\text{int\_gain\_qf} + c*\text{dt\_qf} \quad \text{(equa. 8)}$$

where gain_qf is the gain quality factor for a self regulating process, int_gain_qf is the gain quality factor for an integrating process, tc_qf is the time constant quality factor, and dt_qf is the dead time quality factor. The constants a, b and c may be defined according to the quality factor calculation constants in the table below:

| Process Type | a | b | c |
|---|---|---|---|
| Self regulating | 0.6 | 0.2 | 0.2 |
| Integrating | 0.7 |  | 0.3 |

Again, those of ordinary skill in the art that the values for constants a, b and c are examples only, and may be adjusted as needed.

The final model results may be provided as a mix of the previously identified model in the identified operating region and the new identified model. For example, the model identification results may be rate limited (e.g., clamped) by a configured value (e.g., 0.1 . . . 0.5) multiplied by the range between the low limit and the high limit. In addition, the new model may be weighted by the final quality factor from equation 7 or 8 above, depending on the type of process (self regulating or integrated). For example, the new model may be weighted as follows:

$$\text{new\_model}=\text{previous\_model}*(1-\text{final\_quality\_factor})+\text{rate\_limited\_model}*\text{final\_quality\_factor} \quad (\text{equa. 9})$$

The new model may be stored in the region for which model identification was performed.

Generally, model quality is an indicator of confidence of the last identified model, and may be based on a history of models for each operating region. For example, quality factors and deviation of models over time may be taken into account. A history of five model gains and a running average of quality factors may be stored for each region, in one example. In order to update the quality of a model identified according to the above-described technique, the running average of the quality factor may be updated using the following:

$$\text{new\_qf\_avg}=\text{old\_qf\_avg}*0.7+\text{identification\_qf}*0.3 \quad (\text{equa. 10})$$

The average, minimum and maximum of last five model gains may be calculated, as is the deviation to average ratio. In one example, the deviation to average ratio may be calculated as:

$$\text{dev\_to\_avg} = \frac{\frac{(\text{max\_gain}-\text{min\_gain})}{2.0}}{\text{avg\_gain}} - 0.25 \quad (\text{equa. 11})$$

and limited between 0.0 and 1.0. The final model quality may then be calculated as:

$$\text{new\_final\_model\_quality}=\text{old\_final\_model\_quality}*0.5+ \text{new\_qfavg}*0.5*(1-\text{dev\_to\_avg}) \quad (\text{equa. 12})$$

Each of the real values provided above are examples only, and may be adjusted as needed.

In some embodiments, all model results (e.g, the new model, quality factor and model quality) after being fetched by the function block plug-in 64 may be sent through the ROC service 86, 88 to the model database 92 located on the workstation 13. In the function block plug-in 64, the model and tuning control 104 utilizes the model results to calculate tuning variables for the control function block 58. In particular, the model and tuning control 104 may perform two tasks: (1) select the current approved model based on a selected state variable (which may be the average state variable from equation 1); and (2) calculate and apply new controller tuning (in full or partial adaptation). The current approved model may be selected from an approved models table stored in a memory 116 based on the selected state variable, region boundaries and configured hysteresis. Whenever a new current approved model is changed, new tuning is calculated based on the selected tuning rule, process type and main block type (PID, FCL or other control function blocks). Regardless of whether the model identification is partial or full, a new calculated tuning may be applied to the controller in each instance. In some embodiments, Internal Model Control (IMC) and lambda tuning may be supported.

Further details regarding the applications provided via the workstation 13 (in either a legacy or standard, integrated context) to control and manage implementation of the disclosed techniques are now provided. The applications generally support the utilization of process models identified by the controller 11, as described above, and also provide the functionality associated with the use of the identified models. As described above, the process models need not be generated merely for use in connection with an adaptive control scheme. The identification of process models in accordance with the disclosed technique is implemented regardless of whether the control routine is an adaptive control routine. Identifying process models for all of the control loops—both adaptive and non-adaptive—generally provides the capability to perform a number of different analyses of the process, the process control system, and specific elements thereof. That said, in some cases, the disclosed system may provide an option via a dialog box, window, faceplate, or other display interface to disable model identification on a node-by-node (or loop-by-loop) basis. The display interface may be one of a number of display interfaces generated via the implementation of the applications running on the workstations 13. Examples of such display interfaces are provided in FIGS. 8-15.

Referring again to FIG. 1, as a general matter, the workstations 13 include (either individually, distributed or any other fashion) a suite of operator interface applications and other data structures 140 which may be accessed by any authorized user (e.g., a configuration engineer, operator, etc.) to view and provide functionality with respect to devices, units, etc. connected within the process plant 10. The suite of operator interface applications 140 is stored in a memory 142 of the workstation 13 and each of the applications or entities within the suite of applications 140 is adapted to be executed on a respective processor(s) 144 associated with each workstation 13. While the entire suite of applications 140 is illustrated as being stored in the workstation 13, some of these applications or other entities may be stored and executed in other workstations or computer devices within or associated or in communication with the system 10. Furthermore, the suite of applications 140 may provide display outputs to a display screen 146 associated with the workstation 13 or any other desired display screen or display device, including hand-held devices, laptops, other workstations, printers, etc. Likewise, the applications within the suite of applications 140 may be broken up and executed on two or more computers or machines and may be configured to operate in conjunction with one another.

Figure 7:
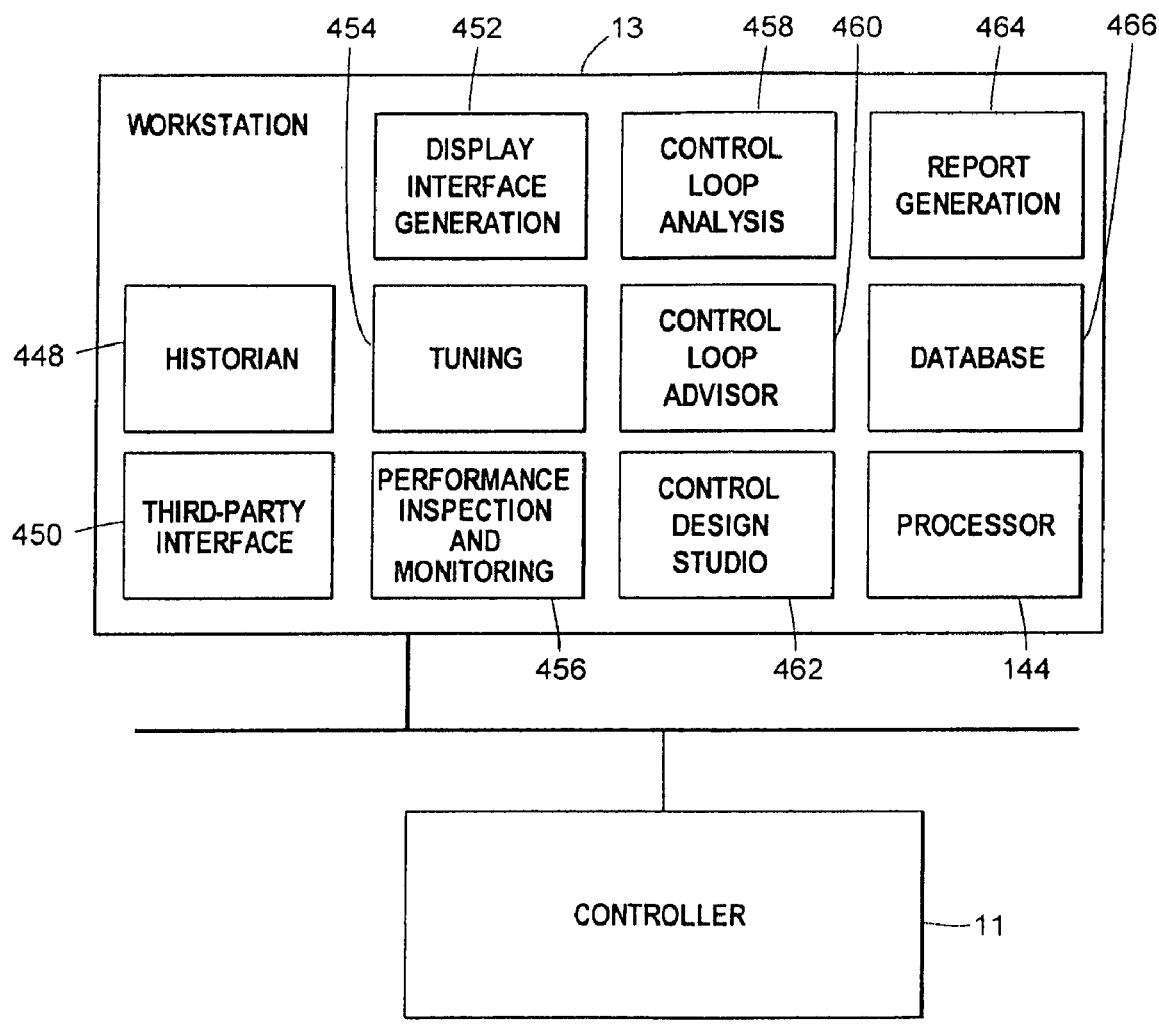
FIG. 7 is a schematic representation of one embodiment of the process control system of FIG. 1 in which a workstation implements an exemplary suite of applications that together provide a control performance monitoring and management environment with associated functionality for, inter alia, loop and model analysis, diagnostics, tuning and MPC and adaptive control.

FIG. 7 shows an exemplary workstation 13 in greater detail in connection with the implementation of the disclosed system, method and model identification techniques. Specifically, the suite of applications 140 may include a number of applications, routines, modules, and other procedural elements directed to the implementation of model-based monitoring and management of the control system 10, as described herein. The applications, routines, modules and elements may be implemented via any combination of software, firmware and hardware and are not limited to the exemplary arrangement shown in FIG. 7. For instance, one or more applications may be integrated to any desired extent.

The application suite may include a historian application 448 dedicated to supporting the recordation of process model data (e.g., parameters) as the models are identified via the above-described techniques. To this end, the historian application 448 may communicate with the historian database 12 or any other memory or storage mechanism. As described above, the process model data may be stored in connection or association with data chronicling the identification of the process model (or the collection of the data leading thereto). The historian application 448 may also provide analytical functionality such as the calculation of totals, averages and other values for selected model parameters. The historian application 448 may facilitate the viewing of such calculated values, as well as the underlying stored data, via one or more display interfaces.

A third-party interface application 450 may be provided to support and maintain a communication link with a third-party or legacy process control system, as described in connection with FIG. 2 (operator interface 82) and FIG. 7. To that end, the application 450 may generate a number of display interfaces to facilitate the configuration of the communication link, maintain and utilize the virtual controller 428, and otherwise support the interface.

Further display interfaces may be provided by an application 452 directed to supporting communications with the controller 11, which may be the application 84 discussed above. Such communications may involve or include the configuration and maintenance of adaptive control routines executing in the controller 11. As is the case throughout the application suite, the display interfaces may take any form, including without limitation dynamos, faceplates, detailed displays, dialog boxes, and windows, and may be configured for display on different display types.

The application suite may include an application 454 dedicated to use of the process model information in connection with tuning. As a result of the above-described model identification techniques, the tuning application 454 is directed to improving process control performance by calculating tuning parameters automatically from normal day-to-day changes in the plant, or from on-demand tuning tests. The tuning results may be used for both "open-loop" tuning recommendations, and for "closed-loop" adaptive control.

More specifically, the tuning application 454 may generate a number of display interfaces to support the performance of continuous tuning calculations for all control loops in either open loop or closed loop operation. The tuning calculations support both standard and adaptive control, on PID, fuzzy logic, and MPC controllers and, thus, provide tuning recommendations for both feedback and feedforward control. The tuning application 454 may also provide on-demand tuning, as described above, using either a relay oscillation or other procedure.

The tuning application 454 has access to the process model history data stored in the historian database 12 (or elsewhere, as desired) and, thus, may calculate optimal tuning using historical process model data. To that end, the display interfaces may provide or include tools to easily peruse the history to locate and select data suitable for such tuning calculations. This aspect of the display interface(s) generated by the tuning application 454 generally allows a user to change model parameters (e.g., time to steady state, event trigger threshold) and re-identify models, or identify models for loops that were not previously enabled for automatic model identification.

The tuning application may also provide an interface to support analysis of a history of tuning calculation results. This capability may facilitate the analysis of adaptive control opportunities and the improvement of adaptive control configurations.

As described above, the tuning application 454 may provide an interface to support the introduction of control "perturbations" that help identify controller tuning when there are few manual changes to the process (i.e., automatic injection on controller output). An option may be provided via the interface to disable perturbations once good tuning is calculated. If multiple control loops are being perturbed, the moves may be synchronized to distribute and minimize the process disturbance.

The tuning application 454 may be responsive to process states and other status indications, such that any calculation results are identified accordingly. In this way, the disclosed system avoids the use of information calculated in the wrong state or with bad process data. To that end, model-related calculations may indicate whether the results are good, bad or not available, with explanations where appropriate.

The tuning application 454 may also generate summary reports to convey, among other things, tuning recommendation information and a user log that documents tuning changes and any adaptive control tuning analysis.

Further details regarding the display interfaces generated by the tuning application 454 (either alone or in conjunction with other applications) are presented in connection with FIGS. 11-15, which generally depict the views of the process models and control loops provided to a user to facilitate the above-described functionality.

With continued reference to FIG. 7, an application 456 is generally directed to automatic control performance monitoring utilizing the process models identified via the disclosed techniques. The application 456 is more specifically directed to improving process control performance by facilitating or automatically implementing (i) the identification of opportunities for control improvement, (ii) the analysis and diagnosis of the source of control problems, and (iii) the generation of meaningful performance reports for operations, control and maintenance personnel. To this end, the application 456 may generate a control performance index based on the process models. This "model-based" index provides a better benchmark to identify control loops that need re-tuning. The new index measures the opportunity for improving control based on factors such as process variability, the identified process model, and existing controller tuning. Such performance monitoring may, if applicable, take into consideration unit states and exclude performance calculations when the loop is in an inappropriate unit state, or when other status indications (e.g., Fieldbus status) or I/O communications are bad. Valve stiction, backlash and other valve diagnostic indices may also be provided for all valves.

The foregoing features and those described below are generally provided via a comparison of control performance done by utilizing the process models that are automatically created via the disclosed techniques. Through the use of the process models, poorly tuned control loops and changes in the process that impact control performance may be identified. Deviations in the process model from the historic values may be used to flag the control loop as a potential process problem.

Again, using the process models, an oscillation index may also be generated by the application 456 to identify loops that are oscillating. More specifically, an oscillation analysis tool may identify other loops that have the same oscillation period and may be interacting with the primary loop. This information may then be used to identify process interactions and possible design recommendations.

Diagnostic information provided by the application 456 may be accompanied by an indication of the expected cause of poor control performance. For example, diagnostics may indicate whether poor control performance is caused by instrumentation errors, valve stiction or backlash, process interactions, or controller tuning.

Generally speaking, the control performance monitoring information may be provided in any desired form, including a number of customized display interfaces and reports. Historical performance reporting may be provided to display how a control loop has performed over a user-specified period of time. Default time periods for such reporting include last hour, last shift (8 hours), last day, last week, last month. The user may be provided an option to "drill down" from summary reports to access detailed loop information. The reports or interfaces may be customized for management summaries with, for instance, an overall weighted performance index for plant-wide and individual process units, trends and/or tables comparing the current period with prior periods, and lists of top priority loops with a corresponding performance measure. Maintenance reports may present control loop performance indices and prioritize work items based on their relevant importance to plant operations. Other reports may provide statistics including data for the control performance index, standard deviation, oscillation index, process model (if available), auto and cross correlation, histogram, power spectrum, etc.

Further details regarding the information provided by the application 456 are provided via the exemplary display interfaces depicted in FIGS. 8-11.

The application suite may also include a separate control loop analysis application 458. In some embodiments, the application 458 is made available via the display interface(s) generated by the application 456. In any event, the application 458 supports analysis of historian or real-time data collected in connection with the above-described model identification techniques. The data may be presented via an interface that facilitates the examination of variation in control from unmeasured disturbances and measurement noise. For example, the problems identified via the applications 454 and 456 may be further examined using the analysis application 458 for diagnosis. To that end, the display interface generated thereby may provide options for calculating power spectrum, autocorrelation and histogram data.

An advisor application 460 may generally provide functionality that utilizes the identified models in connection with diagnostics to detect abnormal conditions or opportunities to improve the control scheme through tuning or algorithm modifications. The information provided by the advisor application 460 may be provided in any type of display interface, including a faceplate generated via the workstation 13, the controller 11 or any other element in communication with the system 10. In one specific example, the display interface may have a flag for indicating the display of a new advisory message, such as "Check Tuning."

More generally, the advisor application 460 may provide recommendations generated as a result of analysis or diagnostics performed by any one of the applications in the suite. Furthermore, the recommendations need not be provided by a display interface generated by the advisor application, but rather may be sent for display to any one or more of the applications in the suite. Thus, recommendations and messages such as "New Tuning Available," "Examine Process—significant change in process has been detected," "Check Valve—dead band/hysteresis large," "Check Tuning—loop unstable," and "Control could be improved using MPC/Adapt" may be generally provided via the workstations 13 or other devices in communication with the process control system 10. In addition to the display of the message or recommendation, details regarding the underlying condition may be stored as a history or other parameter for the control loop. Subsequent access or use of the data stored for the control loop may then cause the details or associated message to be displayed for a user of the advisory or other application in the suite.

Other applications that also support the implementation of the disclosed techniques include a control studio application 462 to facilitate navigation within the process control system 10 and a report generation application 464 for the generation of the aforementioned reports. Lastly, one or more memories or databases 466 may also be provided as part of the application suite.

Figure 8:
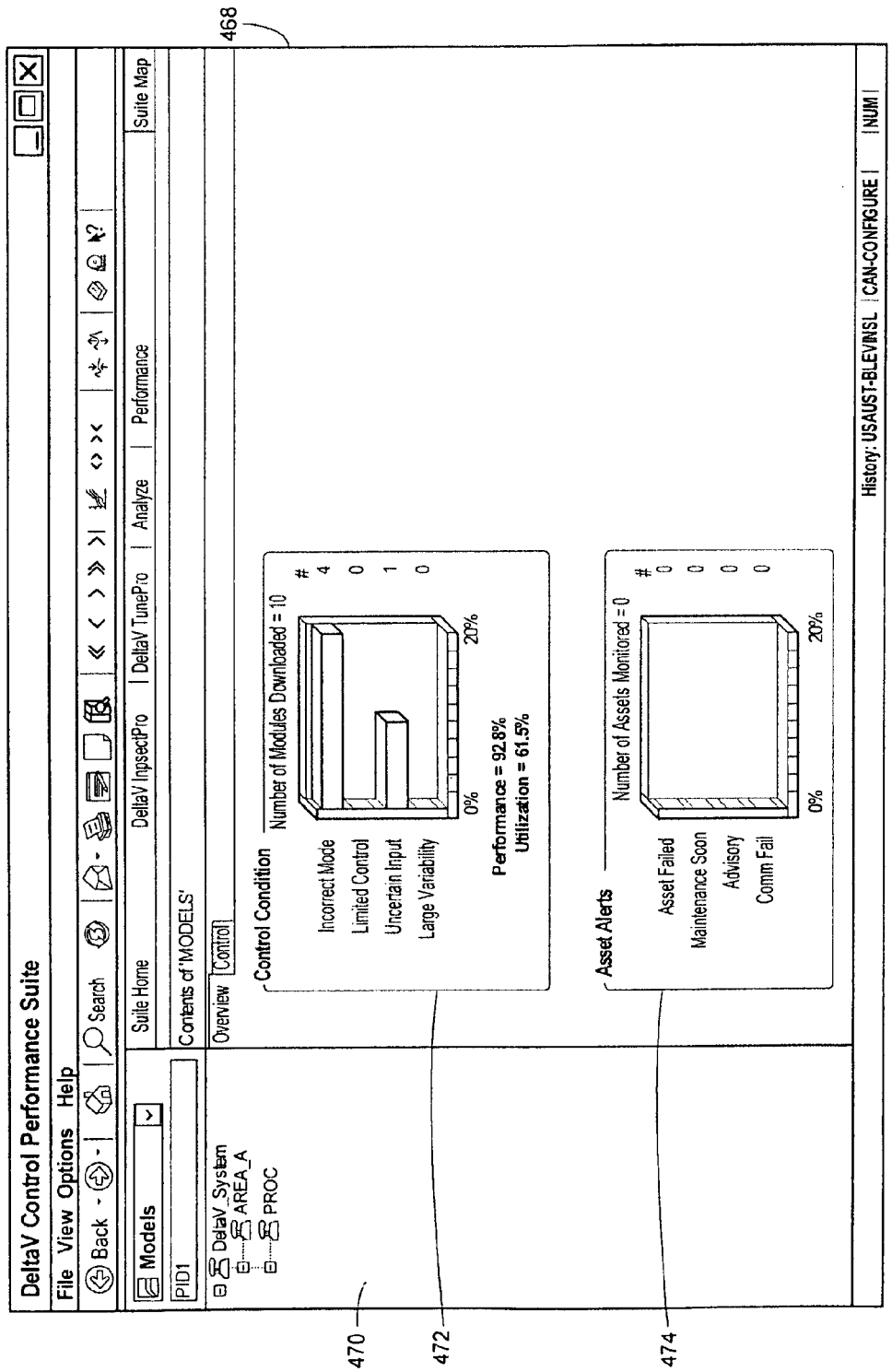
FIG. 8 is a simplified representation of an exemplary display interface generated by an embodiment of the workstation of FIG. 7 having a performance monitoring application to provide control performance overview information.

FIG. 8 depicts an exemplary display interface 468 that may be generated by the performance monitoring application 456 (or, alternatively, any one or more of the other applications) to present overview information resulting from the process model inspection analysis. In this specific example, the display interface 468 presents information indicative of the condition of the control routines or modules in the entire process control system 10, or any area thereof selected via a hierarchy-tree panel 470. The control performance may be specified and summarizes in a chart panel 472 via categories, including "Incorrect Mode," "Limited Control," "Uncertain Input," and "Large Variability." The assignment or classification of a control module, function block or routine into one of these categories is generally enabled by, and may be automatically implemented using, the process models identified via the disclosed techniques. The display interface 468 also includes an asset alert chart panel 474 to present statistical information on the numbers of assets deemed to be failed, requiring maintenance soon, having an advisory alert, or experiencing a communication failure.

Figure 9:
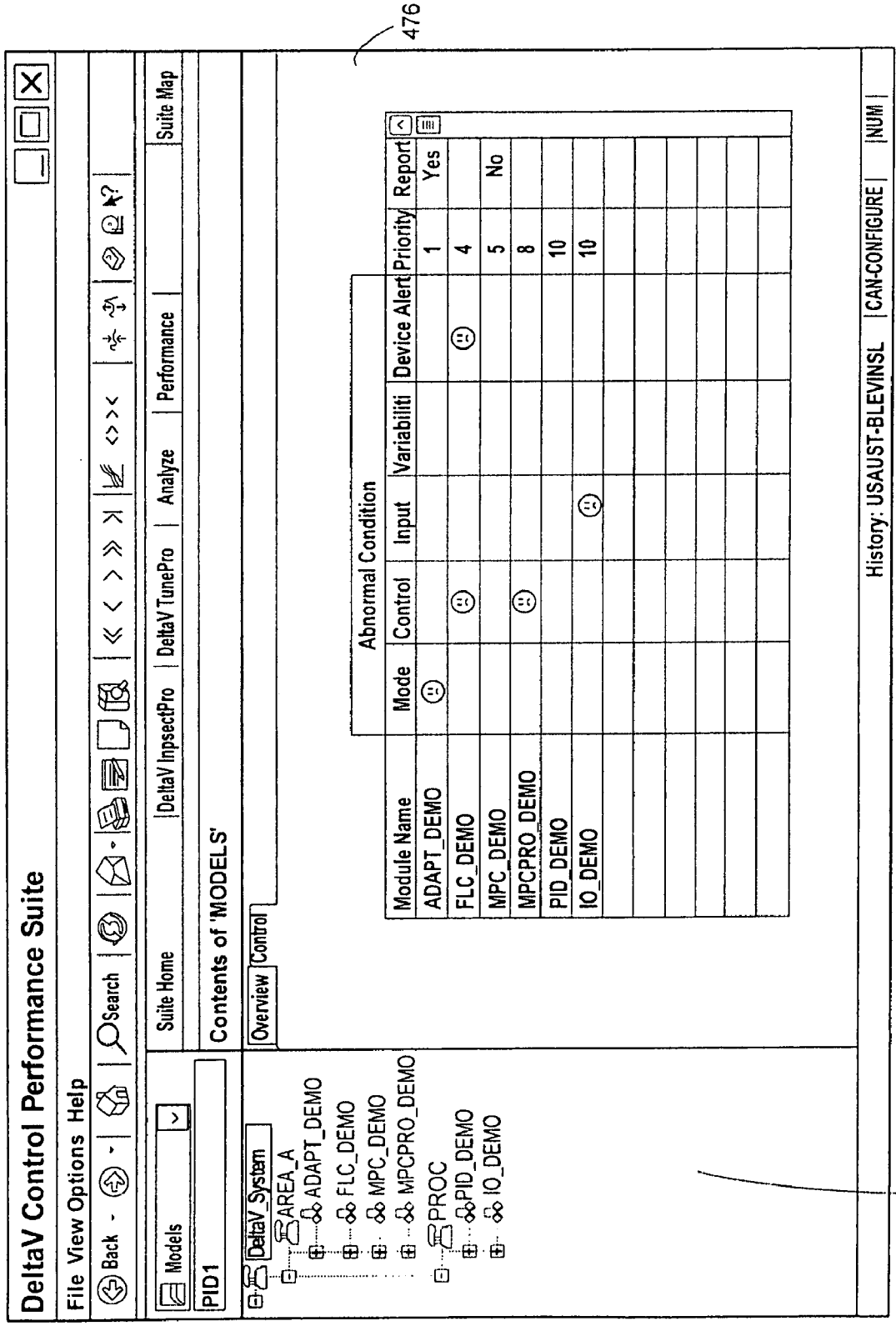
FIG. 9 is a simplified representation of an exemplary display interface generated by an embodiment of the workstation of FIG. 7 having a performance monitoring application to provide control loop performance information for a selected system, area or other group of control loops.

FIG. 9 depicts an exemplary display interface 476 that may also be generated by the performance monitoring application 456. The display interface 476 also generally presents control performance information, but on a more detailed level. In this example, performance information is presented for each control loop or module in an area selected in the hierarchy-tree panel. Each abnormal condition detected for a particular control loop may be noted in a table distinguishing between problems associated with an abnormal mode, limited control, input status, high variability or an inactive, related device. A priority level may also be displayed, along with an indication as to whether a report has been generated describing the abnormal condition.

Figure 10:
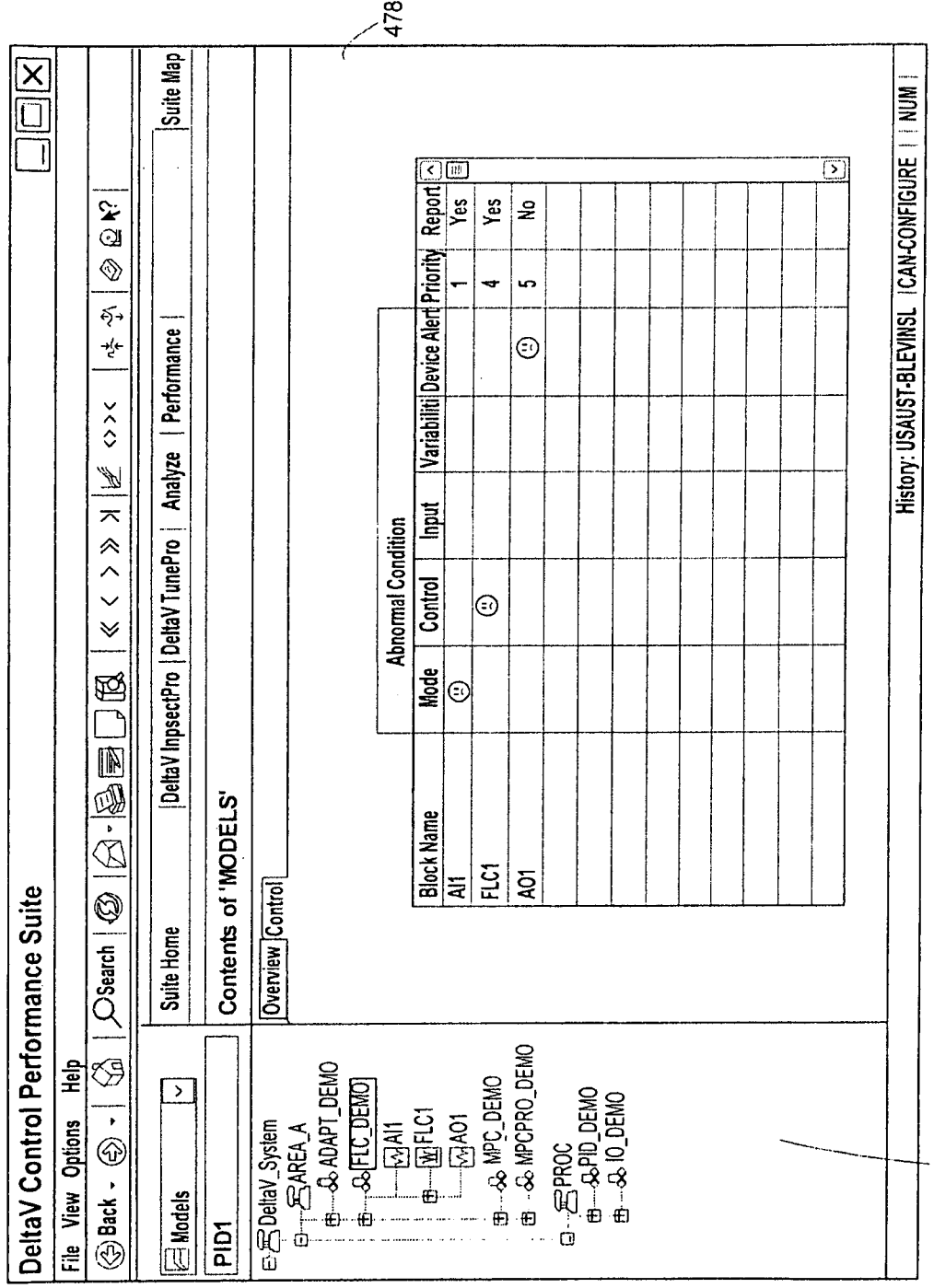
FIG. 10 is a simplified representation of an exemplary display interface generated by an embodiment of the workstation of FIG. 7 having a performance monitoring application to provide performance information for a selected control loop.

FIG. 10 depicts an exemplary display interface 478 that may also be generated by the performance monitoring application 456. The display interface 478 is similar to the interface 476 of FIG. 9, and differs in the control level at which the performance information is presented. In this case, a module or loop is selected via the panel 470, and the performance information is presented for each function block thereof. Diagnostic information for a particular block may then be accessed by selecting (e.g., right-clicking) on the block name displayed in the table.

Figure 11:
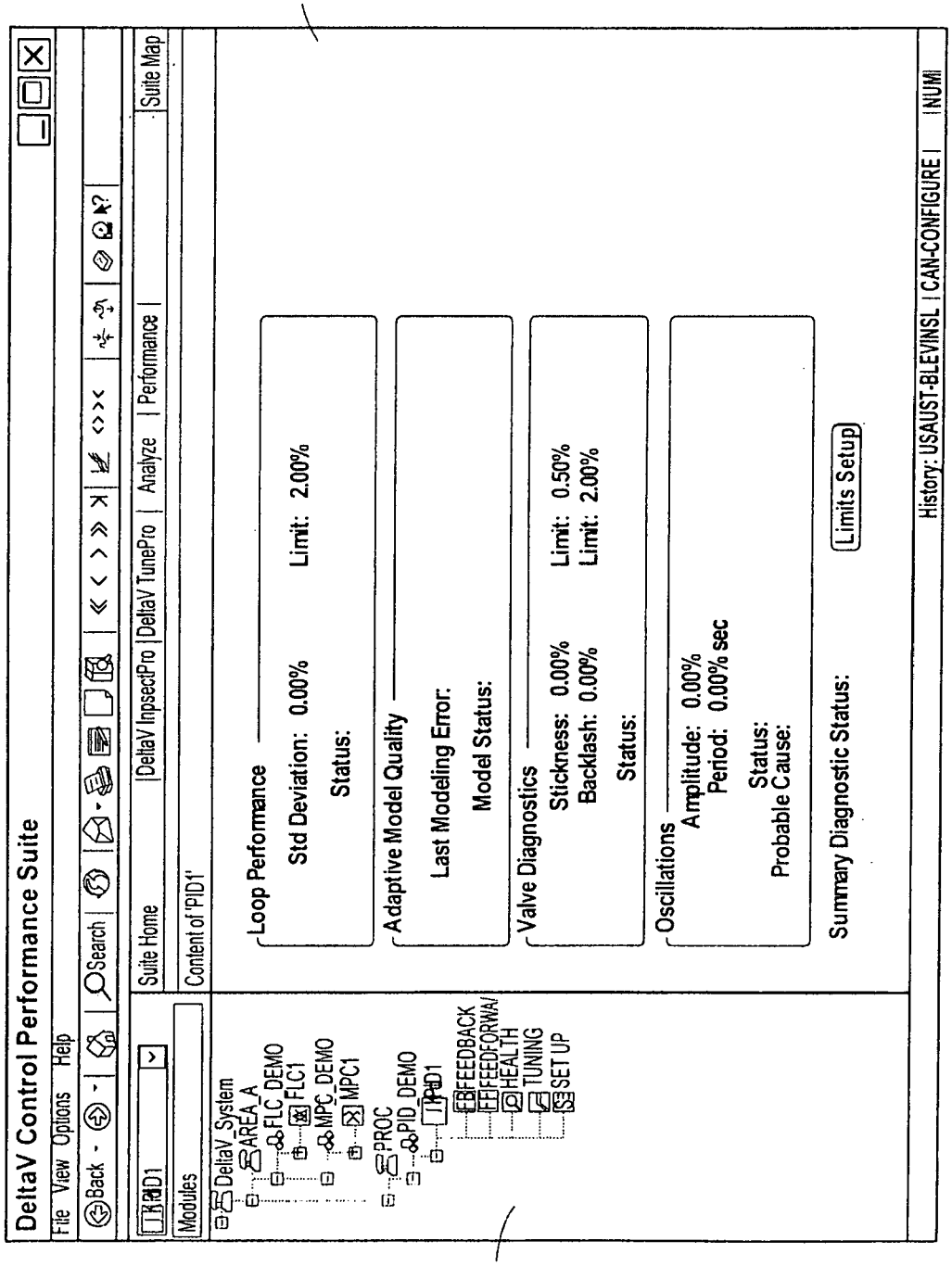
FIG. 11 is a simplified representation of an exemplary display interface generated by an embodiment of the workstation of FIG. 7 having a diagnostics or other analysis application to monitor and manage control loop performance, adaptive model quality, and other diagnostic parameters related to a control loop.

FIG. 11 depicts an exemplary display interface 480 that may be generated by one or more of the applications, including the tuning application 454 and the performance monitoring application 456. Generally speaking, the display interface 480 facilitates the examination of results of diagnostic calculations for a selected control element (e.g., PID1). Limit values for the statistics derived via the calculations are also displayed for comparison and user-modification, as desired. When a limit is exceeded, an alarm may indicate the associated condition. More generally, the information presented in the display interface 480 and the underlying calculations are indicative of how the stability of the control loop is continuously monitored as a result of the process model identification techniques disclosed herein.

Figure 12:
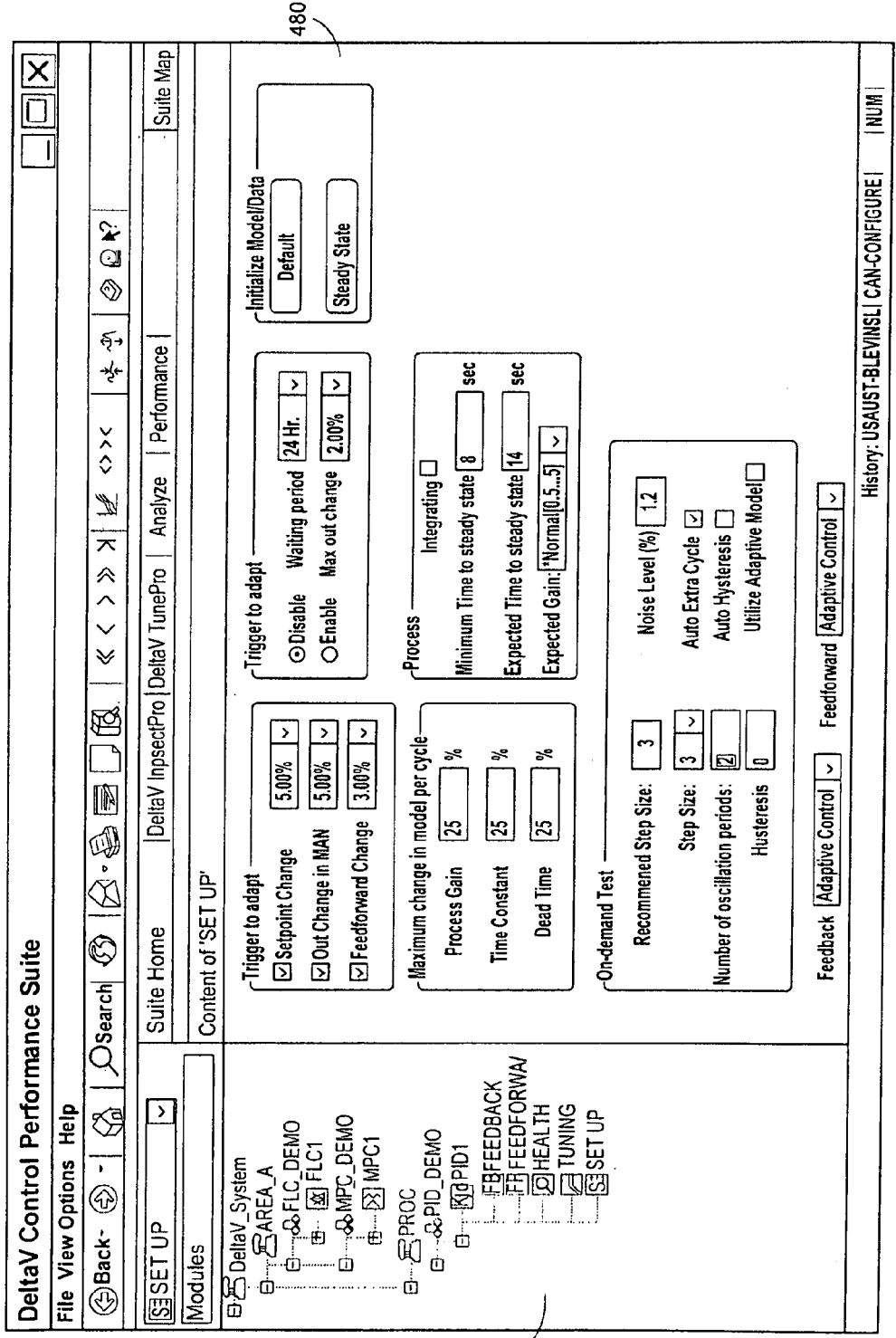
FIG. 12 is a simplified representation of an exemplary display interface generated by an embodiment of the workstation of FIG. 7 having an application to configure, customize and manage the model identification procedure for a control loop.

FIG. 12 depicts an exemplary display interface 482 that facilitates the setup of a control loop for automatic process model identification as well as on-demand model identification. A number of panels are provided via the interface 482 to specify trigger event types, trigger event levels, parameter change maximums, etc. In this way, the display interface 482 enables a user to customize the process model identification procedure on a node-by-node, or loop-by-loop basis.

Figure 13:
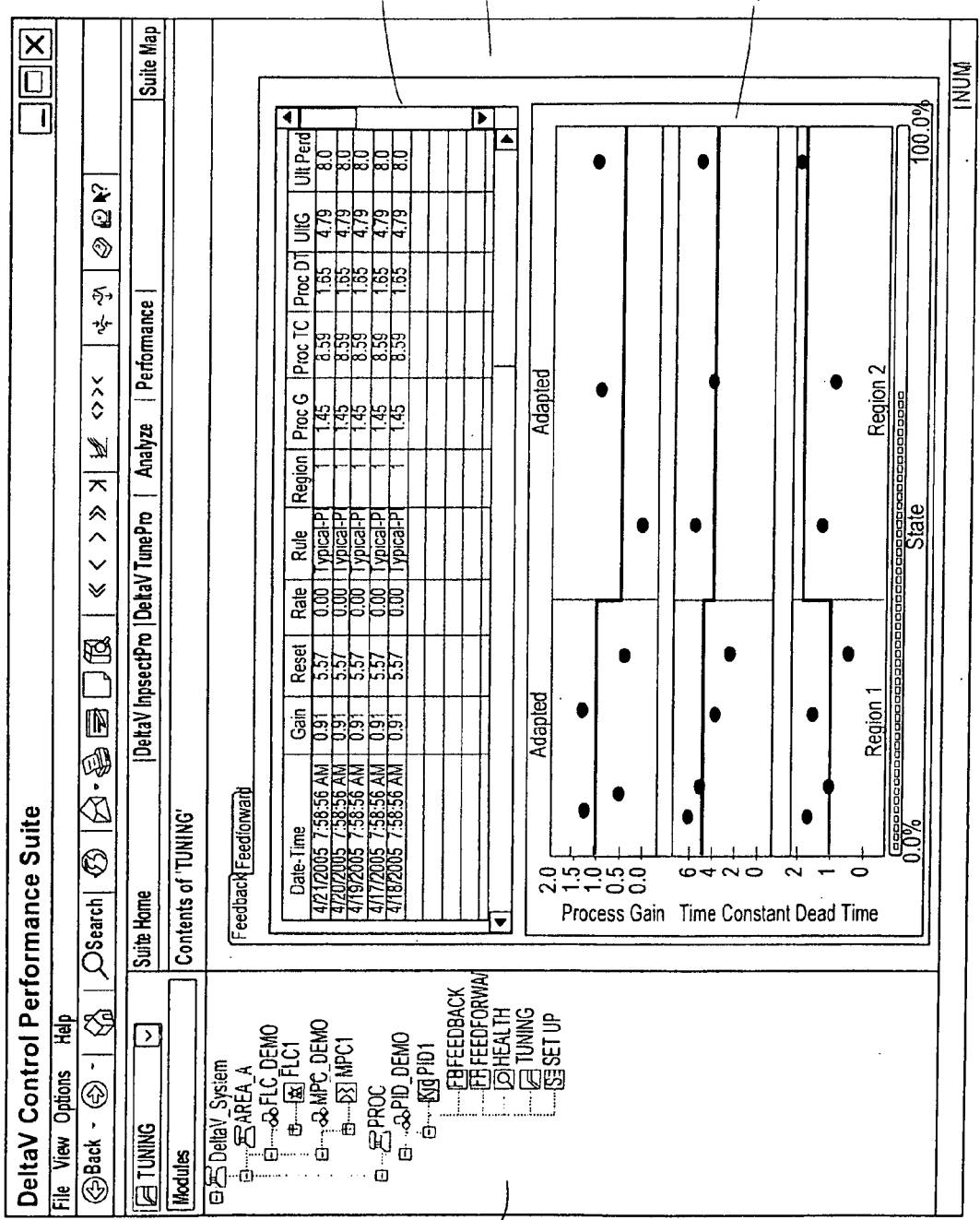
FIG. 13 is a simplified representation of an exemplary display interface generated by an embodiment of the workstation of FIG. 7 to visualize process models identified for different operating conditions indicated by a state parameter input; and, FIGS. 14 and 15 are simplified representations of respective exemplary display interfaces generated by an embodiment of the workstation of FIG. 7 having a tuning application to support and manage the use of process models to tune control function blocks implementing, for instance, fuzzy logic or MPC control schemes.

FIG. 13 generally depicts the way in which a user may visualize the saved process models to, among other things, determine how many regions are required. More specifically, a display interface 484 includes a panel 486 listing process model history information and a model graph panel 488 that shows, via respective horizontal lines, the approved model values and, via the dots, the parameters of process models identified and stored in the history database. As described above, respective models may be approved for a number of regions (e.g., five), and the variance of the model parameters may facilitate the identification of the regions and otherwise help with tuning recommendations.

Figure 14:
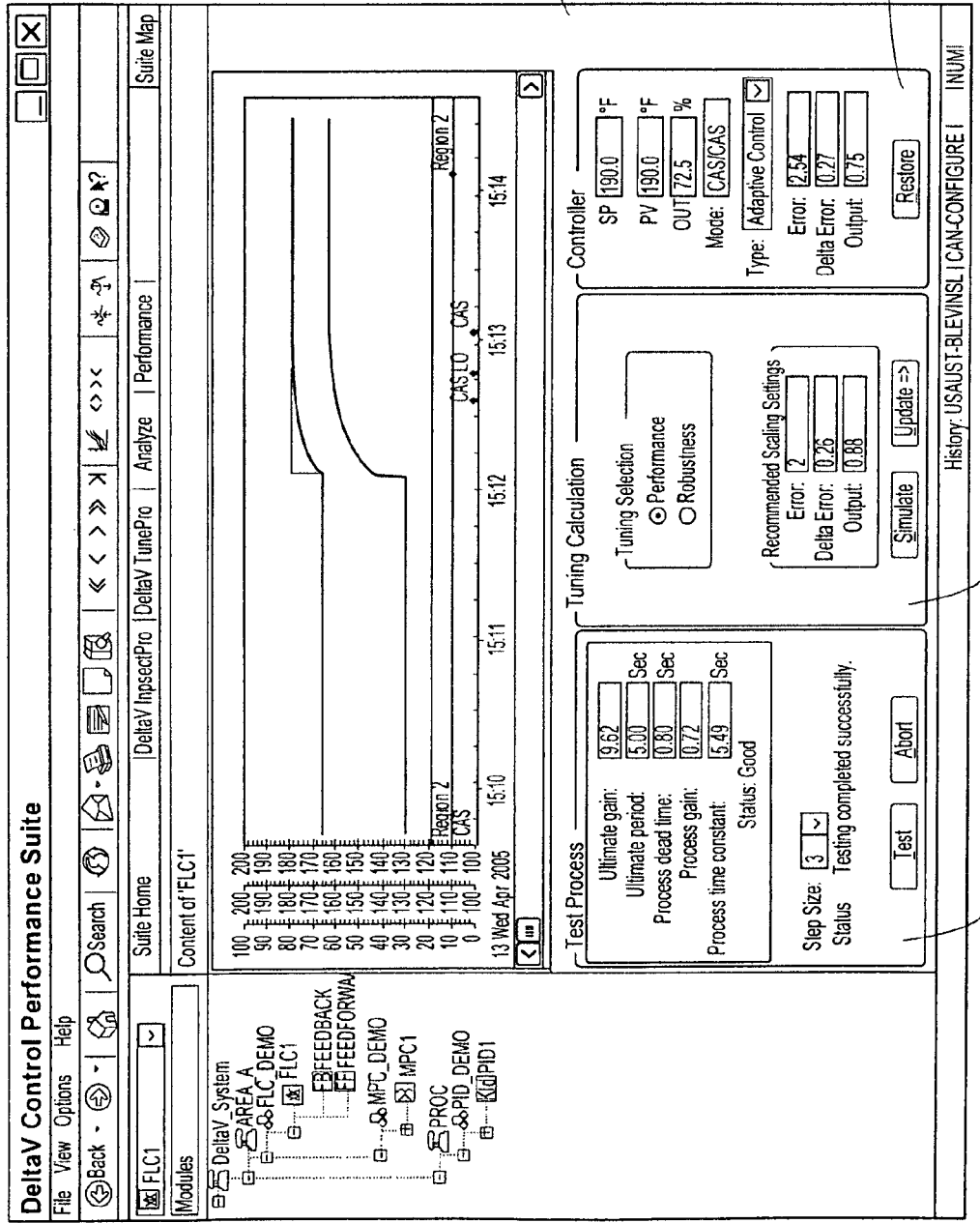
Figure 15:
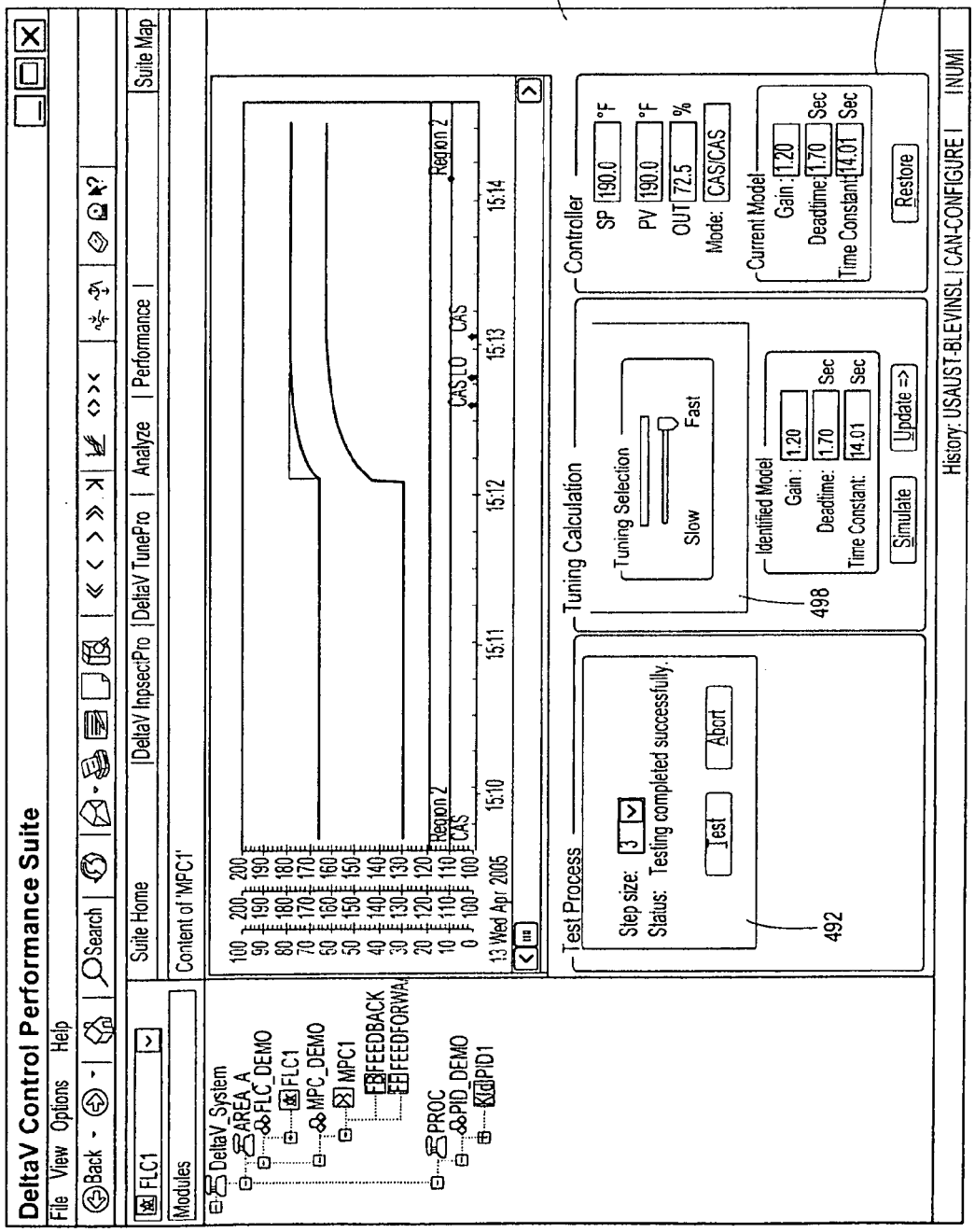

FIGS. 14 and 15 depict process model information for a recently identified model in connection with a fuzzy logic control block and an MPC block, respectively. To that end, display interfaces 490 and 492 provide respective graphical representations of the process model, along with a number of panels 492, 494, 496 and 498 to support testing, tuning calculations, controller parameter settings, tuning simulation, and tuning selection.

While the focus of the above disclosure has been on function blocks, it should be understood that the techniques are applicable to a variety of control designs and strategies in a modern process control system. Based on the above techniques, features of the techniques may include automatically creating a framework for process learning in an online controller without user intervention, dynamically adjusting controller memory and processing requirements by prioritizing tasks without user intervention, automatically learning about the process based on operating data and conditions and acting on any changes in the process conditions. The learning may be executed locally in an online controller independently of other applications, may be executed in a workstation virtual controller independent of other applications, and may be executed as a central server processing historical data. Further, the techniques may allow automatically communicating and storing the results of the embedded learning algorithms, automatically providing a visual and graphical insight into the results and recommendations, including, but not limited to, performance monitoring, process and device diagnostics, process modeling, tuning recommendations, and control strategy. Further, automatic monitoring and response to change in the control configuration may be realized. The techniques may be utilized for a variety of processes (e.g., SISO, MIMO, etc.), can be used for a variety of control strategy (e.g., feedback, feedforward, PID, fuzzy logic, multivariable MPC, etc.), can be used for a variety of process modeling (e.g., model parameter interpolation, step response parametric, step response non-parametric, nonlinear non-parametric such as neural networks, etc.), and can be used for a variety of types of process information (e.g., models, performance and tuning indices, process and control statistics, expert systems, etc.).

The terms "identifying," "identification" and any derivatives thereof are used herein in a broad sense in connection with the use of process models to include the creation of, generation of, and other processing to arrive at, either an entire process model, any one or more parameters to define it, or any other defining characteristics thereof.

Any of the above-described applications may be implemented as routines, modules or other components of one or more integrated applications. The disclosed arrangement of application functionality is provided merely for ease in illustration and is not indicative of the broad range of manners in which the functionality may be provided to an operator or other user. Furthermore, the above-described applications may be provided in varying form depending on user profile, context, and other parameters, as desired. For example, the display interface views generated for one user type (e.g., engineering) may differ in content and other ways from the views generated for a different user type (e.g., maintenance).

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

What is claimed is:

1. An adaptive process control loop controller within a process control environment comprising:
    a control module to control operation of the process control loop including one or more process control loop devices within the process control loop in response to control data from the control module;
    a plug-in module operatively coupled to the control module as a non-layered, integrated extension thereof, the plug-in module comprising a process model identification control routine to examine the control data to detect a change therein, and a collection routine to collect the control data and operating condition data in connection with a condition of the process in response to the detected change; and
    a model identification engine operatively coupled to the plug-in module to receive the collected control data and the collected operating condition data, the model identification engine comprising a model identification routine to execute a plurality of model parameter identification cycles, wherein each cycle comprises:
        a plurality of simulations of the process based on one or more simulation parameters, each simulation having different simulation parameter values and each simulation using the collected control data as an input,
        an estimation error calculation for each simulation based on simulated operation condition data in connection with an output of the simulation and based on the collected operating condition data, and
        a model parameter calculation of a model parameter value based on at least two of the estimation errors and based on simulation parameter values used in the simulation corresponding to each of the at least two estimation errors.

2. The adaptive process control loop controller of claim 1, wherein the model identification engine comprises the model identification routine to iteratively execute each cycle, wherein the plurality of simulations comprise a first, second and third simulation in each cycle, and wherein each subsequent iteration initializes the first simulation with the model parameter value of the preceding iteration of the cycle, and initializes the second and third simulations with the model parameter value of the preceding iteration of the cycle multiplied by a range modifier, wherein the range modifier is decreased with each iteration, and wherein the second and third simulations comprise the upper and lower limits of the process, respectively.

3. The adaptive process control loop controller of claim 1, wherein each cycle corresponds to a different parameter of the model and wherein the model identification engine comprises the model identification routine to sequentially execute the plurality of cycles, with subsequent cycles using the model parameter of one or more of the preceding cycles as a simulation parameter value.

4. The adaptive process control loop controller of claim 1, wherein the process comprises a self regulating process and wherein the model parameter comprises one or more of the group consisting of: a process time constant, a process dead time, a self-regulating process gain.

5. The adaptive process control loop controller of claim 1, wherein the process comprises an integrating process and wherein the model parameter comprises one or more of the group consisting of: a process dead time and an integrating process gain.

6. The adaptive process control loop controller of claim 1, wherein the at least two of the estimation errors comprise the two smallest estimation errors.

7. The adaptive process control loop controller of claim 1, wherein the control data comprises one or more of the group consisting of: a set point change and a controller output.

8. The adaptive process control loop controller of claim 1, wherein a model of the process comprises the model parameter values from the plurality of model parameter identification cycles, and wherein the plug-in module further comprises a model and tuning control routine to calculate a tuning variable for the controller using the model of the process.

9. The adaptive process control loop controller of claim 1, wherein the plug-in module comprises the data collection module to calculate a state variable in connection with the operating state of the process control loop from the control data and operating condition data, and wherein the plug-in module comprises the model and tuning control routine to select the model of the process from a plurality of models of the process based on the calculated state variable.

10. The adaptive process control loop controller of claim 1, wherein the estimation error calculation comprises an integral of a squared error between the simulation output and the collected operating condition data over the collection time of the collected operating condition data.

11. The adaptive process control loop controller of claim 1, wherein the simulation parameter values correspond to the model parameter for which the value is calculated.

12. The adaptive process control loop controller of claim 1, wherein the plug-in module comprises the process model identification control routine to inject the detected change in the controller output to cause the process response to the detected change.

13. A process control system comprising:
an adaptive process controller comprising a control module to control operation of a process using control data, a plug-in module to detect changes in the control data and to collect operation condition data in connection with a condition of the process in response to detecting a change in the control data, and a model identification engine to determine one or more model parameter values based on simulation outputs of the process using the control data as simulation inputs and based on the collected operation condition data, wherein a model of the process comprises the one or more model parameter values to model the process; and
a workstation operatively coupled to the adaptive process controller, the workstation comprising a server to fetch and store the model of the process from the adaptive process controller, and an operator interface application to enable a user to view, analyze and edit the stored model of the process;
wherein the adaptive process controller comprises the model identification engine to retrieve the model of the process from the server in response to a signal from the plug-in module indicating a detected operating state of the process corresponding to the model of the process, and wherein the plug-in module utilizes the model of the process to tune the adaptive process controller.

14. The process control system of claim 13, wherein the workstation comprises the operator interface application to enable a user to utilize the stored model of the process to diagnose and repair a control problem within the process control system.

15. The process control system of claim 13, wherein the plug-in module utilizes the model of the process to tune the adaptive process controller across a plurality of operating regions of the process, wherein each operating region comprises a high limit and a low limit.

16. The process control system of claim 13, wherein the model identification engine is configured to execute:
a plurality of simulations of the process based on one or more simulation parameters, each simulation having different simulation parameter values and each simulation using the collected control data as a simulation input and each simulation providing a simulation output,
an estimation error calculation for each simulation based on a comparison between the simulation outputs and the collected operating condition data, and
a model parameter calculation of a model parameter value based on at least two of the estimation errors and based on simulation parameter values used in the simulation corresponding to each of the at least two estimation errors, wherein the simulation parameter values correspond to the model parameter for which the value is calculated.

17. The process control system of claim 16, wherein the plurality of simulations comprise a first, second and third simulation, and wherein the model identification engine is configured to initialize the first simulation with the model parameter value of the preceding simulation of the process, and initializes the second and third simulations with upper and lower limits of the model parameter of the first simulation of the process, respectively.

18. The process control system of claim 16, wherein the model identification engine is configured to execute the plurality of simulations of the process, the estimation error calculation for each simulation, and the model parameter calculation of a model parameter value for each of a plurality of model parameters.

19. The process control system of claim 18, wherein the process comprises a self regulating process and wherein the plurality of model parameters comprise one or more of the group consisting of: a process time constant, a process dead time and a self-regulating process gain.

20. The process control system of claim 18, wherein the process comprises an integrating process and wherein the model parameters comprises one or more of the group consisting of: a process dead time and an integrating process gain.

21. The process control system of claim 13, wherein the simulation parameter comprises the model parameter for which the value is calculated.

22. The process control system of claim 13, wherein the adaptive process controller comprises a virtual controller, and wherein the workstation comprises the virtual controller.

23. The process control system of claim 13, wherein the adaptive process controller comprises a controller in an online process.

24. The process control system of claim 13, wherein the model identification engine is configured to transmit the model of the process to the workstation based on signal from the plug-in module.

25. The process control system of claim 13, wherein the adaptive process controller is configured to execute a first real-time priority execution thread and second low priority execution thread, wherein the adaptive process controller is configured to execute the control module and the plug-in module in the first real-time priority execution thread, and to execute the model identification engine in the low priority execution thread.

26. A method of controlling a process control system having a plurality of control routines, the method comprising:
  controlling the operation of a process control loop including one or more process control loop devices within the process control loop in response to control data from a control module;
  examining the control data to detect an event indicative of a process change in connection with a control routine of the plurality of control routines associated with the process change;
  collecting control data used by the control routine associated with the process change in response to the detected event;
  collecting operating condition data in connection with a condition of the process in response to the detected event;
  receiving the collected control data and the collected operating condition data;
  identifying a process model for the control routine associated with the process change, wherein identifying a process model comprises executing a plurality of model parameter identification cycles, wherein each cycle comprises:
    executing a plurality of simulations of the process based on one or more simulation parameters, each simulation having different simulation parameter values and each simulation using the collected control data as an input,
    calculating an estimation error for each simulation based on simulated operation condition data in connection with an output of the simulation and based on the collected operating condition data,
    calculating a model parameter value based on at least two of the estimation errors and based on simulation parameter values used in the simulation corresponding to each of the at least two estimation errors, and
    generating a process model from the model parameter values.

27. The method of claim 26, wherein identifying a process model further comprises iteratively executing each cycle, wherein the plurality of simulations comprise a first, second and third simulation in each cycle, and wherein each subsequent iteration comprises:
  initializing the first simulation with the model parameter value of the preceding iteration of the cycle,
  initializing the second and third simulations with the model parameter value of the preceding iteration of the cycle multiplied by a range modifier, and
  decreasing the range modifier with each iteration,
  wherein the second and third simulations comprise the upper and lower limits of the process, respectively.

28. The method of claim 26, wherein each cycle corresponds to a different parameter of the process model, the method further comprising sequentially executing the plurality of cycles, with subsequent cycles using the model parameter of one or more of the preceding cycles as a simulation parameter value.

29. The method of claim 26, wherein a process model comprises the model parameter values from the plurality of model parameter identification cycles, the method further comprising calculating a tuning variable for the control routine using the process model.

30. The method of claim 26, wherein the collected operating condition data is indicative of a response to an injected parameter change applied to the process.

* * * * *

UNITED STATES PATENT AND TRADEMARK OFFICE
CERTIFICATE OF CORRECTION

PATENT NO. : 8,036,760 B2  
APPLICATION NO. : 12/238801  
DATED : October 11, 2011  
INVENTOR(S) : Ashish Mehta et al.

Page 1 of 1

It is certified that error appears in the above-identified patent and that said Letters Patent is hereby corrected as shown below:

On the Title Page:

At Item (57), line 5, "and a collects" should be -- and collects --.

In the Specification:

At Column 3, line 4, "under performing" should be -- underperforming --.

At Column 16, line 6, "In" should be -- in --.

At Column 19, line 7, "etc.,)." should be -- etc.) --.

At Column 20, line 19, "calculate" should be -- calculated --.

At Column 23, line 36, "(e.g," should be -- (e.g., --.

Signed and Sealed this  
Nineteenth Day of March, 2013

Teresa Stanek Rea  
*Acting Director of the United States Patent and Trademark Office*